United States Patent [19]
Matsumoto et al.

[11] Patent Number: 5,333,240
[45] Date of Patent: Jul. 26, 1994

[54] NEURAL NETWORK STATE DIAGNOSTIC SYSTEM FOR EQUIPMENT

[75] Inventors: Hiroshi Matsumoto, Ibaraki; Masahide Nomura, Hitachi; Makoto Shimoda, Katsuta; Tadayoshi Saito, Ohta; Hiroshi Yokoyama; Kenji Baba, both of Hitachi; Junzo Kawakami; Yasunori Katayama, both of Mito; Akira Kaji; Seiitsu Nigawara, both of Hitachi, all of Japan

[73] Assignee: Hitachi, Ltd., Tokyo, Japan

[21] Appl. No.: 508,664

[22] Filed: Apr. 13, 1990

[30] Foreign Application Priority Data

Apr. 14, 1989 [JP] Japan ................................. 1-95034

[51] Int. Cl.⁵ .......................... G06F 15/18; G21C 7/36
[52] U.S. Cl. ...................................... 395/23; 395/24; 395/904; 395/22; 395/11
[58] Field of Search ............... 364/513, 200, 148, 590, 364/508; 395/23, 906, 914, 24, 11, 904, 22

[56] References Cited

U.S. PATENT DOCUMENTS

| | | | |
|---|---|---|---|
| 3,273,125 | 9/1966 | Jakowatz | 364/513 |
| 4,302,813 | 11/1981 | Kurihara et al. | 364/494 |
| 4,380,172 | 4/1983 | Imam et al. | 79/659 |
| 4,479,241 | 10/1984 | Buckley | 395/20 |
| 4,520,674 | 6/1985 | Canada et al. | 364/508 |
| 4,683,542 | 7/1987 | Taniguti | 364/550 |
| 4,802,103 | 1/1989 | Foggin et al. | 364/900 |
| 4,874,963 | 10/1989 | Alspector | 377/2 |
| 4,912,649 | 3/1990 | Wood | 364/200 |
| 4,972,363 | 11/1990 | Nguyen et al. | 364/148 |
| 4,972,473 | 11/1990 | Ejiri et al. | 364/602 |
| 5,010,769 | 4/1991 | King et al. | 364/508 |
| 5,023,045 | 6/1991 | Watanabe et al. | 364/148 |
| 5,092,343 | 3/1992 | Spitzer et al. | 395/22 |
| 5,093,792 | 3/1992 | Taki et al. | 364/431.01 |
| 5,093,899 | 3/1992 | Hirawa | 395/23 |

OTHER PUBLICATIONS

"Process Fault Detection and Diagnosis Using Neural Networks-I. Steady State Process", Venkatasubramanian et al, Computer Chem. Engineering, Feb. 15, 1990.

"A Multilayered Neural Network Controller", Pasaltis et al, 1988 IEEE.

Caulfield et al, "Applications of Neural Networks to the Manufacturing Environment", Optical Testing and Metrology II (1988).

Industrie-Auzeiger, "Akustische Qualitatsuberwachung und Fehlerdiagnose Produktdiagnose mit System", by Dr. Ing B. Kotterba, 29, 1989.

Technische Rundschau, "Neuronal Netzwerk: ein neur Stern am Computerhimmel?", by Von Benedikt Humpert, Feb. 1989.

Technische Rundschau Nov. 1988, "Expertensysteme fur die Fertigungstechnik" by Von Gisela Kiratli.

*The Development and Application of Turbomac, An Expert Machinery Diagnostic System,* by Phil Parge, et al., Radian Corporation, Seminar sponsored by Electric Power Research Institute, May 27-29, 1987, Boston Mass.

Primary Examiner—Allen R. MacDonald
Assistant Examiner—George Davis
Attorney, Agent, or Firm—Antonelli, Terry, Stout & Kraus

[57] ABSTRACT

A state diagnostic system for equipment is disclosed. The system is constructed of a neural network model for learning in advance one or more samples of information on vibrations, which are produced in a specific operation state of the equipment, in association with the corresponding operation state and obtaining an output signal corresponding to results of the learning when information on vibrations produced upon operation of the equipment is inputted; an input unit for inputting to the neural network model the information on the vibrations produced upon operation of the equipment; and an output unit for outputting the output signal from the neural network model as diagnostic results to a user. State diagnostic methods, learning system, preview/predict system, diagnosis training system, service life estimation assisting system, service life estimation assisting system, and maintenance assisting system are also disclosed.

23 Claims, 14 Drawing Sheets

FIG. 2

| NO. | WAVEFORM OF VIBRATIONS | PHENOMENON | CAUSE |
|---|---|---|---|
| 1 | 〜〜〜 | GRADUALLY CHANGING UNBALANCE | a. CHANGES IN ALIGNMENT<br>b. THERMAL BENDING OF ROTOR |
| 2 | 〜〜〜 | ABRUPTLY OCCURRED UNBALANCE | a. DISLOCATION OF COUPLING<br>b. UNEVEN MAGNETIC ATTRACTION FORCE |
| 3 | 〜〜〜 | OIL OR LIQUID WHIP | a. UNEVEN STRENGTH OF OIL FILM FOR SLIDE BEARING<br>b. FLUID FORCE IN WATER-SEALED CLEARANCE |
| 4 | 〜〜〜 | WHIRLING DUE TO INTERNAL FRICTION | a. SLIPPING AT ENGAGED PARTS OF ROTOR DISKS<br>b. INTERNAL FRICTION OF ROTOR MATERIAL |
| 5 | 〜〜〜 | WHIRLING DUE TO DRY FRICTION | a. CONTACT BETWEEN ROTATING PART AND STATIONARY PART |
| 6 | 〜〜〜 | STEAM WHIRL | a. UNEVEN CLEARANCES AT BLADE TIPS<br>b. UNEVEN LABYRINTH SEAL |
| 7 | 〜〜 | SUBHARMONIC RESONANCE | a. BACKLASH AND LOOSENESS AT BEARINGS<br>b. PENETRATION OF FOREIGN MATERIAL IN ENGAGED PARTS OF BEARINGS |
| 8 | 〜〜〜 | SECONDARY CRITICAL SPEED | a. NON-SYMMETRY OF FLEXURAL RIGIDITY OF SHAFT |
| 9 | 〜〜〜 | VIBRATIONS BY CRACK | a. DEVELOPMENT OF A CRACK IN A PART OF SHAFT |
| 10 | 〜〜〜 | NORMAL OPERATION | a. NO ABNORMALITY |

FIG. 6

SETTING OF METHOD FOR THE LEARNING OF VIBRATION PHENOMENA

LEARNING SEQUENCE SETTING SQ : SEQUENTIAL NO.
SP : SAMPLE NO.

| SQ | SP | SQ | SP | SQ | SP | SQ | SP | SQ | SP | SQ | SP | SQ | SP | SQ | SP | SQ | SP | SQ | SP |
|----|----|----|----|----|----|----|----|----|----|----|----|----|----|----|----|----|----|----|----|
| 1  | 1  | 2  | 2  | 3  | 3  | 4  | 4  | 5  | 5  | 6  | 6  | 7  | 7  | 8  | 8  | 9  | 9  | 10 | 10 |
| 11 | 1  | 12 | 2  | 13 | 3  | 14 | 4  | 15 | 5  | 16 | 6  | 17 | 7  | 18 | 8  | 19 | 9  | 20 | 10 |
| 21 |    | 22 |    | 23 |    | 24 |    | 25 |    | 26 |    | 27 |    | 28 |    | 29 |    | 30 |    |
| 31 |    | 32 |    | 33 |    | 34 |    | 35 |    | 36 |    | 37 |    | 38 |    | 39 |    | 40 |    |
| 41 |    | 42 |    | 43 |    | 44 |    | 45 |    | 46 |    | 47 |    | 48 |    | 49 |    | 50 |    |
| 51 |    | 52 |    | 53 |    | 54 |    | 55 |    | 56 |    | 57 |    | 58 |    | 59 |    | 60 |    |
| 61 |    | 62 |    | 63 |    | 64 |    | 65 |    | 66 |    | 67 |    | 68 |    | 69 |    | 70 |    |
| 71 |    | 72 |    | 73 |    | 74 |    | 75 |    | 76 |    | 77 |    | 78 |    | 79 |    | 80 |    |
| 81 |    | 82 |    | 83 |    | 84 |    | 85 |    | 86 |    | 87 |    | 88 |    | 89 |    | 90 |    |
| 91 |    | 92 |    | 93 |    | 94 |    | 95 |    | 96 |    | 97 |    | 98 |    | 99 |    | 100|    |

SETTING OF LEARNING CYCLE NUMBER

NUMBER OF LEARNING CYCLES : 10 TIMES

FIG. 11

DIAGNOSIS RESULTS OF ABNORMAL VIBRATIONS OF THE STEAM TURBINE

| PHENOMENON | CAUSE | CERTAINTY FACTOR % |
|---|---|---|
| 3 OIL OR LIQUID WHIP | a. UNEVEN STRENGTH OF OIL FILM FOR SLIDE BEARING<br>b. FLUID FORCE IN WATER-SEALED CLEARANCE | 100 |
| 10 NORMAL OPERATION | a. NO ABNORMALITY | 36 |
| 6 STEAM WHIRL | a. UNEVEN ANGULAR INTERVALS BETWEEN BLADE TIPS<br>b. IMPROPER PASSAGE DIMENSIONS OF LABYRINTH SEAL | 18 |
| 8 SECONDARY CRITICAL SPEED | a. NON-SYMMETRY OF FLEXURAL STRENGTH OF SHAFT | 18 |
| 7 SUBHARMONIC RESONANCE | a. BACKLASH AND LOOSENESS AT BEARINGS<br>b. PENETRATION OF FOREIGN MATERIAL IN ENGAGED PARTS OF BEARINGS<br>c. POOR SEATING OF BEARINGS | 10 |

NEURAL NETWORK STATE DIAGNOSTIC SYSTEM FOR EQUIPMENT

BACKGROUND OF THE INVENTION

The present invention relates to systems for diagnosing the state of operation of an apparatus, equipment, facilities or the like (hereinafter collectively called "equipment") on the basis of information of vibrations of the equipment, and specifically to state diagnostic systems for equipment, in which the state of operation of the equipment is diagnosed by using results of learning of information on vibrations in the past.

In general, an abnormality which has occurred in equipment is often detected as specific vibrations, for example, as abnormal mechanical vibrations. In the case of rotating machines for example, such abnormalities often appear as vibrations of their shafts. It has hence been attempted to determine the presence or absence abnormalities in equipment and further to estimate their causes by monitoring vibrations such as vibrations of shafts.

As a first conventional method, there is the method discussed in An ASME Publication, 81-JPGC-Pwr-28. According to this method, the waveform of vibrations recorded is subjected to a spectrum analysis and the cause of the abnormality is estimated using a diagnostic logic table.

A second conventional method is discussed in the paper (entitled: The Development and Application of TURBOMAC An Expert Machinery Diagnostic System) added at the EPRI Seminar on Expert Systems Applications in Power Plants, May 27-29, 1989, Boston. This method is applied to estimate the cause of each abnormality by using knowledge engineering. According to this method, the cause of the abnormality is determined by performing a search among a number of diagnostic rules provided in advance.

The above conventional techniques are however accompanied by the following problems.

In the first method, spectrum analyses must be performed in real time. It is thus indispensable to use a special processor or high-performance computer for this purpose, whereby the diagnostic system becomes costly. Further, a diagnostic logic table is prepared by an expert or specialist well versed in abnormal phenomena of the target equipment such as a rotating machine. A great deal of time is therefore required for the preparation of such a diagnostic logic table. In addition, diagnostic results reflect individual differences of the person who prepared the logic, so that they lack objectivity.

Further, neither the degree of each abnormality (hereinafter called the "abnormality level") nor the reliability of the diagnostic results (hereinafter called the "certainty factor") is shown by the diagnostic logic table, whereby a user (e.g., an operator) does not know how much he should rely upon the importance and reliability of the diagnostic results. Accordingly, the evaluation of the diagnostic results is also highly dependent on the subjectivity of the user. Use of such a diagnostic logic table therefore involves problems in objectivity.

In the second method on the other hand, the group of diagnostic rules is constructed in the form of a large relational tree. A lot of time is therefore required for inference (the search of the relational tree), so that the second method is practiced as an off-line diagnosis. To perform the second method in real time, a high-performance computer is required. Further, as in the first conventional method, the diagnostic rules are prepared by an expert or specialist well versed in abnormal phenomena of the target equipment. A lot of time is therefore required for their preparation. In addition, diagnostic results reflect individual differences of the person who prepared the diagnostic rules, and lack objectivity. Further, base data for diagnoses are selected by a user from multiple-choice data on the signs of abnormalities and are inputted in a diagnostic system. Therefore, diagnostic results inevitably reflect individual differences of the user. As a result, the certainty factor also reflect the arbitrariness of both the person who prepared the diagnostic rules and the person who inputted base data for diagnoses. The certainty factor therefore does not have persuasive power.

As has been described above, the above conventional techniques are accompanied by the drawbacks that they require a lot of time for the preparation of a diagnostic logic, they cannot provide any processing speed fast enough to perform real time processing, and diagnostic results lack objectivity.

SUMMARY OF THE INVENTION

An object of the present invention is therefore to provide a state diagnostic system for equipment, which does not require the time-consuming preparation of a diagnostic logic by an expert or specialist, said diagnostic logic tending to reflect individual differences, and permits an easy and objective diagnosis of the presence or absence of an abnormality in the equipment.

Another object of the present invention is to provide a state diagnostic system for equipment, which upon diagnosis, does not require a lot of processing time unlike the searching of a relational tree but permits a diagnosis in a short time.

In one aspect of the present invention, there is thus provided a state diagnostic system for equipment, comprising:

a neural network model for learning in advance one or more samples of information on vibrations, which are produced in a specific operation state of the equipment, in association with the corresponding operation state and obtaining an output signal corresponding to results of the learning when information on vibrations produced upon operation of the equipment is inputted;

a means for inputting to the neural network model the information on the vibrations produced upon operation of the equipment; and a means for outputting the output signal from the neural network model as diagnostic results to a user.

The above diagnostic system is preferably provided with a learning means for successively feeding one or more samples of information on vibrations, which are produced in the specific operation state of the equipment, to the neural network model and causing the neural network model to learn to obtain a different output signal for each operation state.

Further, the above diagnostic system is preferably provided with a learning means for successively feeding one or more samples of information on vibrations, which are produced in the specific operation state of the equipment, to the neural network model and causing the neural network model to learn to obtain a different output signal for each operation state; and an output means for indicating the state of learning of the neural network model.

Means adopted in the equipment state diagnostic systems of the present invention will next be described more specifically.

To automatically learn abnormal phenomena of equipment by using operation data of an actual equipment, a learning means for determining the in-circuit connection strength is adopted so that when the operation data of the actual equipment are fed as learning samples to an input layer by using a neural network model, especially, a multilayer neural network model, output signals of the same pattern as a target output pattern given in advance as teacher signals corresponding to causes of abnormalities can be obtained from an output layer.

Further, to estimate the cause of an abnormality with a certainty factor in accordance with the similarity between the plural abnormal phenomena learned by the above means and the state of an actual operation, a diagnosis means is adopted to set an actual operation state in the input layer and then to diagnose the cause of the abnormality and also to determine its certainty factor, both based on the position and level of a signal which appears in the output layer at that time.

In addition, to efficiently practice the above automatic learning, a means as a learning man-machine is adopted. Owing to this means, a user can set the structural parameter of the above model, the order of feeding of the learning samples and conditions for the termination of the learning, as desired and an in-circuit connection strength distribution as results of the learning and variations of the in-circuit energy state in the course of the learning can be indicated to the user.

Besides, to furnish the above diagnostic results in an easily-understandable form to the user, a means is adopted as a diagnostic man-machine. Owing to this means, the in-circuit signal level distribution, the output signal level distribution in the output layer and abnormality causes in the order of their certainty factors can be indicated to the user.

Incidentally, the above neural network model is a network modeled by imitating the processing of information in the neural network. It can be constructed, for example, of a means defining an input layer, a hidden unit layer, an output layer, and a circuit network connecting the input layer, hidden unit layer and output layer, whereby a neural network is constructed; a learning means for feeding a learning sample and a teacher signal (target output pattern) to the neural network to have the neural network learn the learning sample, whereby an in-circuit connection strength distribution is formed; and a means for storing and holding the in-circuit connection strength distribution obtained as results of the learning.

Illustrative of the target of diagnosis by the present invention include machines such as rotating machines and facilities such as plants. In particular, the present invention can be suitably applied to those producing a vibrated state when operated. Illustrative of the vibrated state include mechanical vibrations, acoustic vibrations and oscillations, and electrical vibrations and oscillations. Further, the present invention can also be applied to facilities which contain one or more machines, apparatus and/or equipment, including power plants and the like by way of example.

A description will next be made of the function of each of the above means when the diagnosis of an abnormality of equipment is conducted in accordance with the present invention.

The learning means for determining a learning sample of an abnormal phenomenon as the above-described in-circuit connection strength corrects, by repeat computation, the in-circuit connection strength in the direction that the difference between the teacher signal and an output signal is reduced. When another learning sample is fed to the input layer, the learning means also correct in a similar manner the in-circuit connection strength in the direction that the difference between a teacher signal corresponding to this learning sample and an output signal is reduced. As a result, plural learning samples corresponding to a like plural number of abnormal phenomena can be learned in the same neural network model in the same manner.

Therefore, as teacher signals, it is only necessary to define a target output pattern so that a signal can be outputted simply at a specific position of the output layer in accordance with the cause of each abnormality. It is no longer needed to prepare a diagnostic logic by spending a lot of time as in the conventional method. The abnormal phenomena can be learned automatically.

The diagnostic means for detecting an abnormality during operation by using the neural network model, which has already completed by learning of the abnormal phenomena by the above means, and diagnosing the cause of the abnormality and also determining its certainty factor functions in such a way that the determination of the cause of the abnormality and its certainty factor are indicated by the position of an output signal outputted as a strong signal to the output layer as a result of the conversion of an input signal in accordance with the in-circuit connection strength which was determined at the time of the learning of the abnormal phenomena. The above conversion of the input signal is achieved by simple functional operation and summing operation only, so that spectrum analysis and relational tree search as required by the conventional method can be obviated. The processing time is therefore extremely shortened, thereby making it possible to perform real time processing. In addition, the certainty factor thus obtained indicates the degree of similarity between the pattern already learned and the pattern under diagnosis, so that objective diagnostic information having high persuasive power can be furnished to the user.

The means as a learning man-machine functions in such a way that the size and shape of a neural network model to be used can be automatically set in accordance with structural parameters designated by the user as desired. In this means, plural learning samples are automatically learned and controlled in accordance with an order of indication and conditions for ending the learning, both of which are also designated by the user as desired. Pursuant to a request for indication from the user, this means can also process information on the in-circuit connection strength distribution and a change in the state of the in-circuit energy and then indicate the results of the processing. Accordingly, this means facilitates the determination of suitable size and shape of the neural network model, whereby the processing times upon learning and diagnosis can be shortened and the accuracy of the diagnosis can be increased.

The means as a diagnostic man-machine can indicate, as results of a diagnosis at the time of the occurrence of an abnormality, the in-circuit signal level distribution and the output signal level distribution together with the input signal pattern. It is hence possible to furnish objective information on the cause of the abnormality and its certainty factor. When plural causes can be thought of for an abnormality, this means can provide the user with information on such causes after rearranging them in the descending order of their output signal levels. This make it possible to promptly figure out the situation and also take a necessary countermeasure in the event of occurrence of an abnormality.

The present invention does not require a diagnostic logic, whose preparation is time-consuming. Moreover, it is possible to minimize the inclusion of the subjectivity of an operator or the like upon inputting data for diagnosis or evaluating the results. This permits an objective diagnosis. Diagnostic processing can be performed in a short time by using a neural network model which has already been taught.

BRIEF DESCRIPTION OF THE DRAWINGS

The above and other objects, features and advantages of the present invention will become apparent from the following description and the appended claims, taken in conjunction with the accompanying drawings, in which:

FIG. 2 is a schematic illustration of details of learning samples;

FIG. 6 schematically illustrates a method for setting a learning procedure;

FIG. 11 is a schematic view of a method for displaying, on the screen of a CRT, diagnostic results as a guidance to an operator;

DETAILED DESCRIPTION OF THE INVENTION AND PREFERRED EMBODIMENTS

Figure 1:
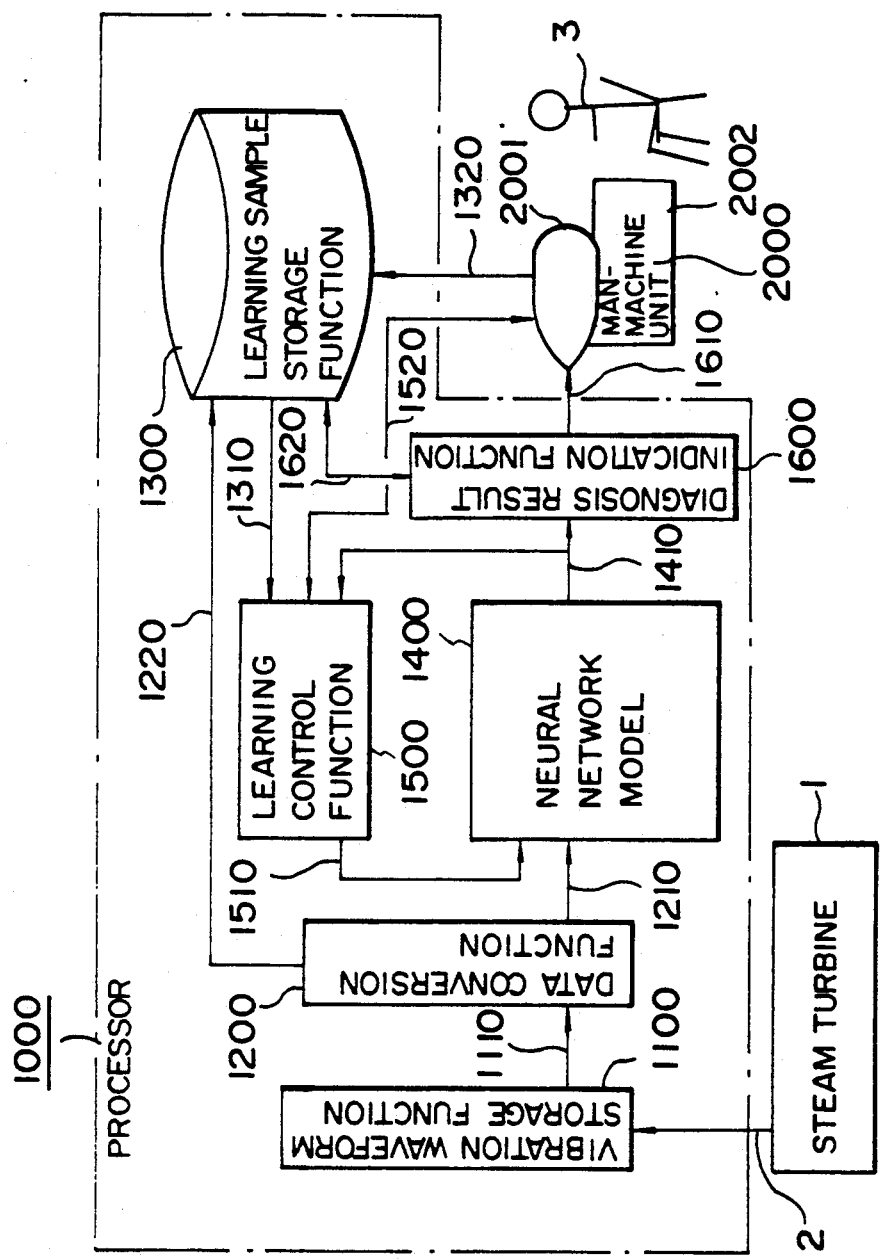
FIG. 1 is a block diagram showing the overall construction of a diagnostic system according to one embodiment of the present invention.

Referring first to FIG. 1, an abnormality diagnostic system according to one embodiment of the present invention will be described. The diagnostic system is applied to a steam turbine in a power plant.

The system is constructed of a processor 1000 for learning and diagnosing an abnormal phenomenon by using as an input vibration signals 2 detected by a detector (not shown) for mechanical vibrations of a rotary shaft of a steam turbine 1; and a man-machine unit 2000 for indicating diagnostic results of an abnormality of learning control information in accordance with a request from an operator 3.

The processor 1000 includes the following functions: a vibration waveform storage function 1100 for storing, as vibration waveform data 1110, vibration signals 2 over a predetermined time period; a data conversion function 1200 for converting the vibration waveform data 1110 to produce abnormality monitoring data 1210 and learning data 1220; a learning sample storage function 1300 for storing, in a predetermined form, plural abnormal phenomena as learning samples on the basis of the learning data 1220; a learning control function 1500 for causing a below-described neural network model 1400 to learn the plural learning sample information 1310, which are stored in the learning sample storage function 1300, by a prescribed procedure; the neural network model 1400 for storing, as in-circuit connection strength, the learning input data 1510 fed from the learning control function 1500 and outputting, based on the in-circuit connection strength, a perception signal 1410 by using the abnormality monitoring data 1200 inputted from the data conversion function 1200; and a diagnostic result indicating function 1600 for indicating, in a readily-understandable form, diagnostic results 1610 to the operator 3 on the basis of the perception signal 1410.

The processor 1000 of this system can comprise an information processor which has arithmetic unit, storage unit, control unit, I/O control unit, etc. as hardware. The above-described functions are performed by these hardware and programs which are supplied.

The neural network model 1400 has, for example, a function for defining an input layer, a hidden unit layer, an output layer, and a circuit network thereof in a room; an arithmetic function employed during learning and diagnosis; and a function for storing and holding the in-circuit connection strength distribution and the like. These functions can be performed by programs and a memory. The number, arrangement and the like of input layers, hidden unit layers and the like are determined as structural parameters by external instructions.

The neural network model 1400 can be constructed by independently providing a means for defining an input layer, a hidden unit layer and the like to establish a neural network network; a means for causing the thus-established neural network to learn to form an in-circuit connection strength distribution; a means for storing and holding the in-circuit connection strength distribution obtained as results of the learning; and a diagnostic means. The neural network model can be constructed by partly or entirely combining these means into an inseparable unit.

Further, the neural network model 1400 of this embodiment can be stored by storing its functions as programs and data.

Where a state once learned is a fixed state, the neural network model can be formed as hardware instead of using such circuit elements. Namely, the neural network model can be provided as a neural network model IC.

The learning sample storage function 1300 is constructed, for example, of a storage unit such as a magnetic disc, optical disc or RAM.

Although not illustrated in the drawing, the system of this embodiment has one or more detectors for feeding vibration data to the computer processor 1000 and an interface therefor. The detector or detectors are arranged at locations on the steam turbine 1, where vibrations of the steam turbine can be detected.

In the present embodiment, vibration information is inputted at predetermined intervals from the steam turbine 1 as a target equipment. As an alternative, vibration data may be detected and stored in advance. A diagnosis may then be performed on the basis of the data so stored.

The diagnostic result indicating function 1600 has the function to correlate a perception signal—outputted from the neural network model 1400—to the corresponding information, which has been stored in advance and indicates the diagnostic results, and also the above-described function to store the diagnostic results.

The correlating function also includes a function to sort diagnostic results in accordance with the sizes of the patterns of perception signals.

As the diagnostic results, messages indicative of the details of abnormal phenomena and possible causes of such abnormal phenomena are stored as shown in FIG. 2, which will be described subsequently. Besides, other information can also be added as needed.

When the system of the present invention is applied to the other embodiments to be described herein, messages inherent to the respective embodiments are stored as diagnostic results.

Further, various diagnostic results indicated at the diagnostic result indicating function 1600 can be stored in the storage unit which makes up the above-described learning sample storage function 1300.

The man-machine unit 2000 of the diagnostic system in the present embodiment is composed of a display 2001, such as CRT, for outputting and displaying various information to the operator 3 and an input unit 2002, such as keyboard, by which the operator 3 inputs various instructions to the system.

The system of the present embodiment performs a diagnosis in the following manner. Information on various abnormal vibrations are taught as learning samples to the neural network model. Vibration waveform data, which has been fed from the vibration waveform storage function 1100 via the data conversion function, are fed to the neural network model so taught. A diagnosis is then performed based on the position and level of a perception signal occurred at the output terminal of the neural network model. Upon display of the diagnostic results, a corresponding display format and corresponding messages, both stored in advance, are selected on the basis of the perception signal, are sent to the man-machine unit 2000, and are displayed there.

Each of the above functions will hereinafter be specifically described by its construction and function.

FIG. 2 shows the details of learning samples stored in the learning sample storage function 1300.

The ten types of samples shown in this drawing indicate vibration waveforms characteristic to different abnormal phenomena and their causes. The vibration waveforms have a value (x) normalized at the data conversion function 1200. The range of the value is $0 \leq x \leq 1$. Normalization can be obviated depending upon the amplitude.

Learning samples may be provided externally as needed rather than storing them. Needless to say, the learning sample storage function can be constructed not only to store learning samples but also to be provided externally with data.

A description will next be made of the neural network model 1500 and the learning control function 1500.

Figure 3:
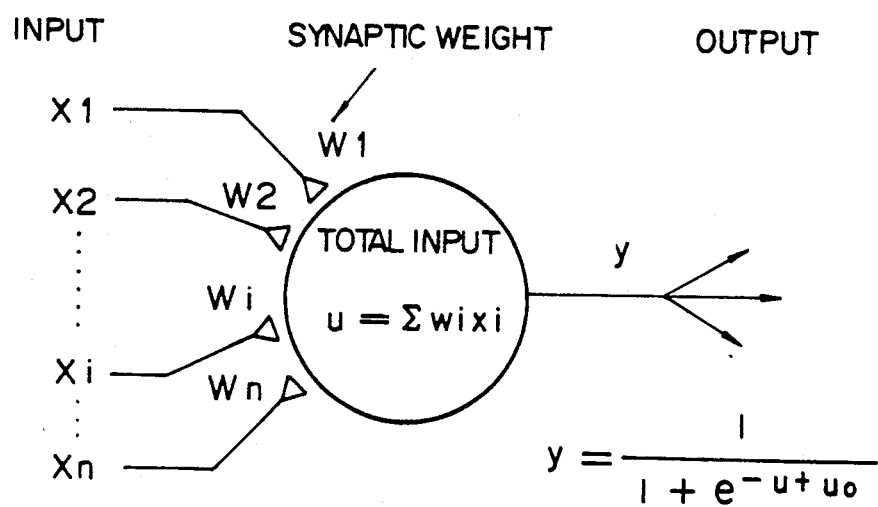
FIG. 3 is a schematic illustration of one of unit models constructing a neural network model.

FIG. 3 illustrates one of unit models 1420 which make up the neural network model 1400.

Assume that input signals $x_1, x_2, \ldots x_n$ to the unit model take a range (0,1) while synaptic weights $w_1, w_2, \ldots w_n$ take a range $(-\infty, +\infty)$. Also assume that an input $u_i$ transmitted to the unit model in response to the $i^{th}$ input signal $x_i$ is expressed by the following formula:

$$u_i = W_i x_i \tag{1}$$

Then, the total input U to the unit model is defined by:

$$U = \sum_{i=1}^{n} U_i \tag{2}$$

On the other hand, a unit output y is defined by:

$$y = \frac{1}{1 + e^{-U + U_0}} \tag{3}$$

where $U_o$ is a bias.

Figure 4:
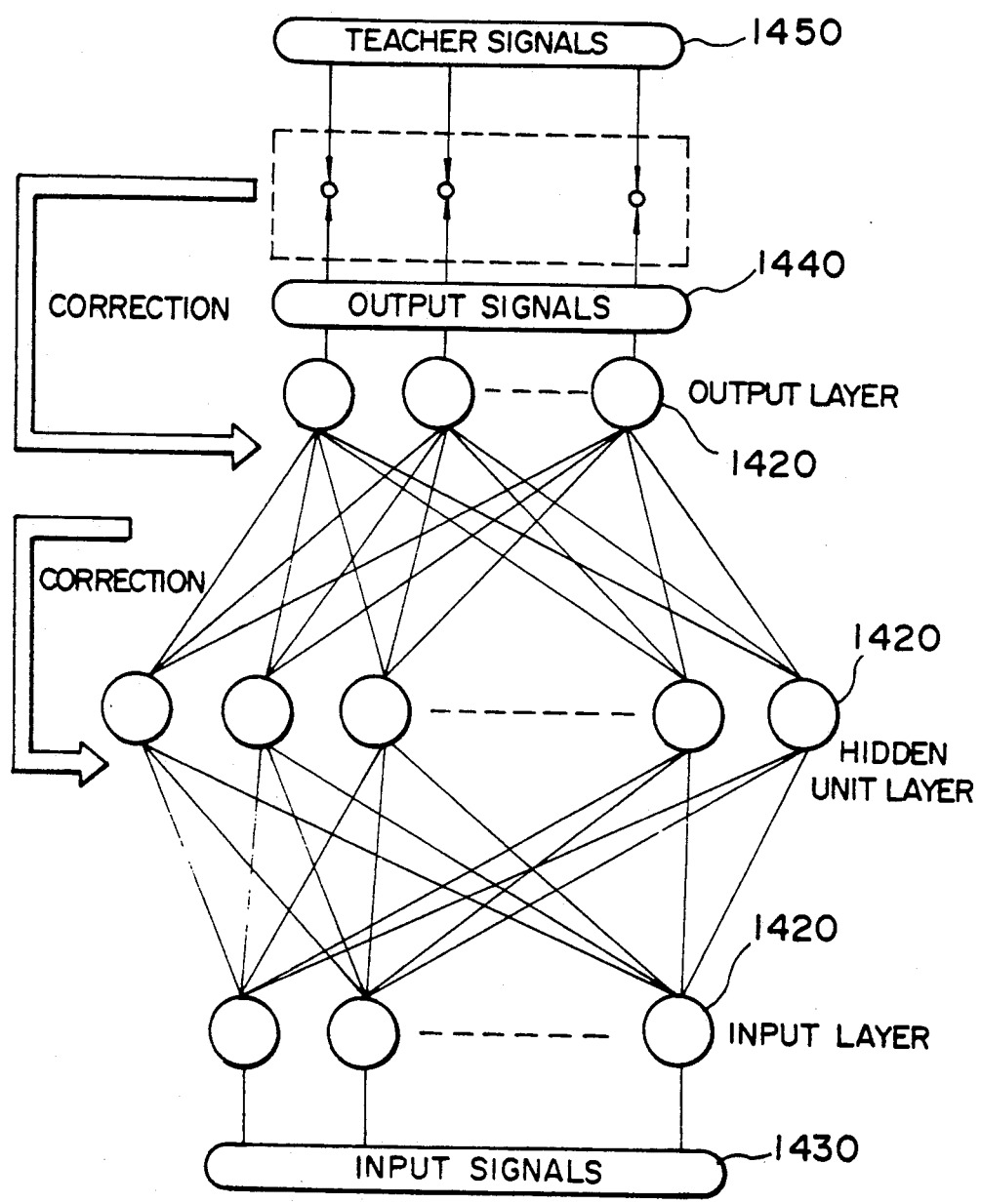
FIG. 4 schematically depicts the basic construction of a neural network diagram and the basic procedure of a learning algorithm.

In the present embodiment, unit models 1420 one of which has been described above are arranged in layers as shown in FIG. 4. The neural network model 1400 is constructed by combining the individual unit models 1420 in such a way that an output signal from each unit 1420 in one layer is fed as an input signal to each unit 1420 in the next layer.

The unit models 1420 and the neural network model 1400 are discussed in detail in The MIT Press, Neurocomputing Foundations of Research, 318–162 (1988).

In the above paper, there is disclosed a learning algorithm (called "back propagation") which when an input signal pattern 1430 is fed to the input layer, corrects the connection strength, namely, synaptic weight to the input portion of each unit in each of the hidden unit and output layers in accordance with the difference between an output signal pattern 1440 from the output layer and a desired signal pattern, namely, the teacher signal pattern 1450 so that the output signal pattern 1440 becomes the teacher signal pattern 1450. In the learning control function 1500 of the present embodiment, the learning algorithm itself uses the back propagation disclosed in the above paper.

Figure 5:
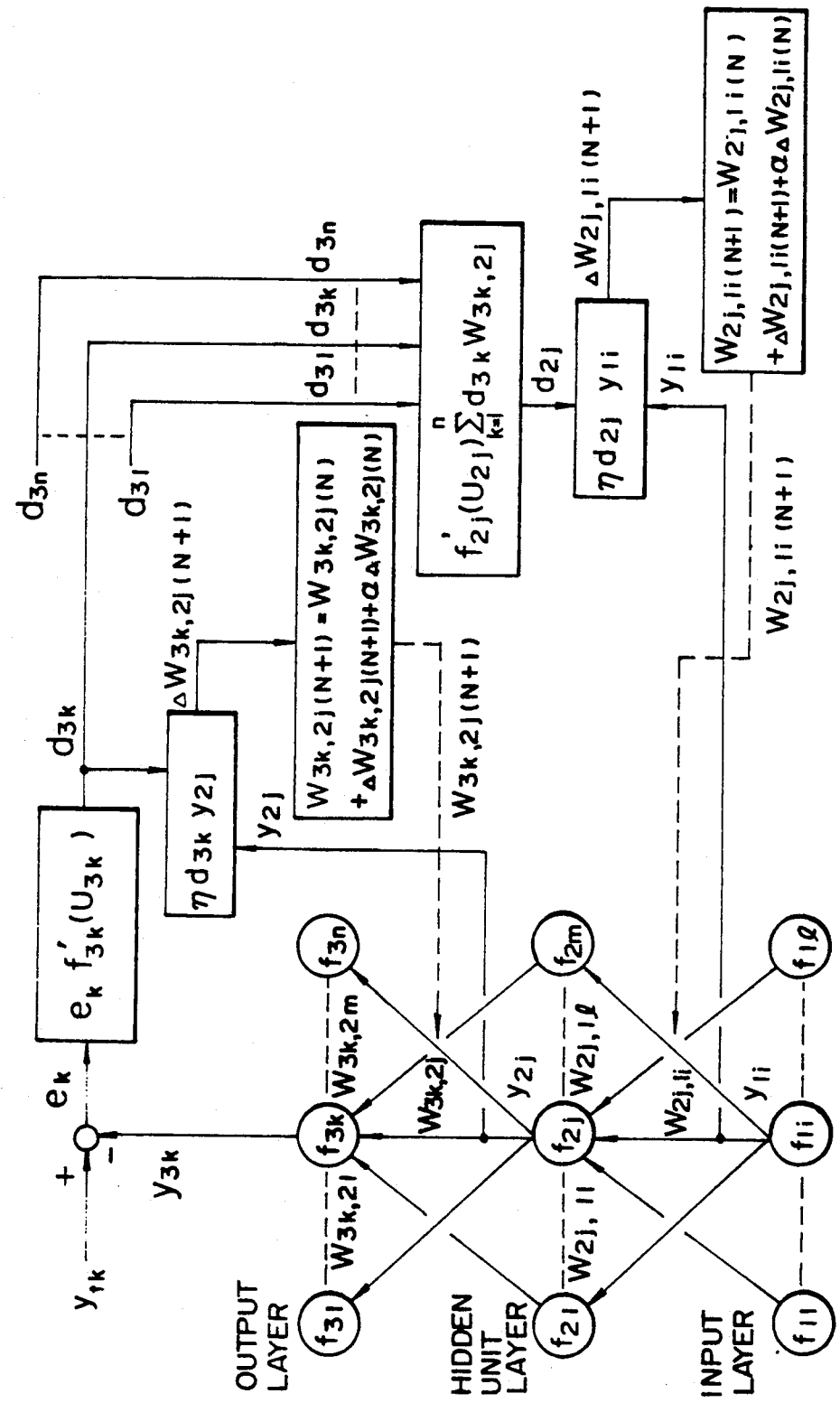
FIG. 5 schematically shows the details of the procedure of the learning algorithm.

FIG. 5 specifically illustrates the algorithm of back propagation. In the drawing, to facilitate the understanding of the algorithm, attention is focused on the $k^{th}$ output signal $y_{3k}$ in the output layer and a correction procedure of a synaptic weight for having it coincided with a teacher signal $Y_{tk}$ is illustrated.

The algorithm shown in Table 5 will hereinafter be described specifically.

First, the difference $e_k$ between the $k^{th}$ output signal $y_{3k}$ and the teacher signal $y_{tk}$ is expressed as follows:

$$e_k = y_{tk} - y_{3k} \tag{4}$$

Assuming that the degree $d_{3k}$ of influence of the error in the operation level $U_{3k}$ of the unit is $d_{3k}$, $d_{3k}$ can be defined by:

$$d_{3k} = e_k f_{3k}(U_{3k}) \tag{5}$$

where $$f(U) = \frac{df}{dU} = \frac{d}{dU}\left[\frac{1}{1+e^{-U+U_0}}\right] \quad (6)$$

Accordingly, the correction degree $\Delta w_{3k,2j}(N+1)$ for the synaptic weight $w_{3k,2j}$ at the $j^{th}$ input portion of the $k^{th}$ unit in the output layer is given by the following formula:

$$\Delta w_{3k,2j}(N+1) = \eta d_{3k} y_{2j} \quad (7)$$

where N is a symbol indicating the preceding number and $\eta$ is called a "learning constant". Further, $y_{2j}$ indicates the $j^{th}$ output signal from the hidden unit layer. To materialize stable convergence, the correction degree obtained by the formula (7) is not used as is. It is modified by the method represented by the below-described formula (7), whereby a new synaptic weight $w_{3k,2j}(N+1)$ is obtained as follows:

$$w_{3k,2j}(N+1) = w_{3k,2j}(N) + \Delta w_{3k,2j}(N+1) + \alpha \Delta w_{3k,2j}(N) \quad (8)$$

where $\alpha$ is called a "smoothing factor".

The correction method of each synaptic weight in each input portion of the output layer has been described above.

A description will next be made of a method for correcting each synaptic weight in each input portion of the hidden unit layer. In FIG. 5, attention is focused on the synaptic weight $w_{2j,1i}$ in the $i^{th}$ input portion of the $j^{th}$ unit in the hidden unit layer and a correction method of the synaptic weight is illustrated.

In this case, the influence degree $d_{2j}$ of the difference in the operating level $U_{2j}$ of the unit should be determined by taking into consideration the total difference of the outputs from the whole units of the output layer. The influence degree $d_{2j}$ is thus expressed as follows:

$$d_{2j} = f_2(U_{2j}) \sum_{k=1}^{n} d_{3k} w_{3k,2j} \quad (9)$$

Accordingly, the correction degree $\Delta w_{2j,1i}(N+1)$ to the synaptic weight in the $i^{th}$ input portion of the $j^{th}$ unit in the hidden unit layer is given by:

$$\Delta w_{2j,1i}(N+1) = \eta d_{2j} y_{1i} \quad (10)$$

where N is a symbol indicating the preceding number and $\eta$ is called a "learning constant". Further, $y_{1i}$ indicates the $i^{th}$ output signal from the input layer. Similarly to the case of the output layer, to materialize stable convergence, the correction degree obtained by the formula (10) is not used as is. It is modified by the method represented by the below-described formula, whereby a new synaptic weight $w_{2j,1i}(N+1)$ is obtained as follows:

$$w_{2j,1i}(N+1) = w_{2j,1i}(N) + \Delta w_{2j,1i}(N+1) + \alpha \Delta w_{2j,1i}(N) \quad (11)$$

where $\alpha$ is called a "smoothing factor".

The difference $e_k$ can be minimized by repeating the arithmetic processings of the formulae (4)–(11). Namely, it is possible to bring the output signal pattern, which is obtained from the output layer, into conformity with the teacher signal pattern. As a result, the input signal pattern has been stored (learnt) as a synaptic weight distribution (i.e., an in-circuit connection strength distribution) in the neural network model.

If another input signal pattern is fed to the input layer and another teacher signal pattern is also provided correspondingly, the above algorithm is operated to store (learn) a new synaptic weight distribution.

The use of such an algorithm makes it possible to store plural learning samples in the same neural network model. Further, the use of the neural network learned as described above allows to obtain from the output layer an output signal pattern corresponding the closest one of the patterns already learned even when a new pattern is inputted.

By the method described above, the neural network model 1400 is caused to learn the plural vibration waveforms in combination with the corresponding abnormal phenomena and causes, all shown in FIG. 2.

Here, the learning control function 1500 is caused by the operator 3 as a user to perform the control of the learning by the method set in the manner shown in FIG. 6 by way of the display screen of the CRT of the man-machine unit 2000.

In FIG. 6, "SP" stands for the sample number of each vibration waveform depicted in FIG. 2 while "SQ" means a sequential number to set in which sequence the above sample is learned. The term "number of learning cycles" indicates the number of repetitions of one cycle in which all the samples set by the above method are learned.

In the example of FIG. 6, it is shown that taking up to the sequential No. 20 as one cycle, this sequence is repeated 10 cycles. However, for each sample, the number of termination of the repeat computation is designated separately.

Prior to the learning, the number of layers as structural parameters of the neural network model 1400 and the number of units in each of the layers are set through the man-machine unit 2000.

Further, a random in-circuit connection strength distribution is set in the neural network model 1400. This makes it possible to prevent biased learning.

Figure 7:
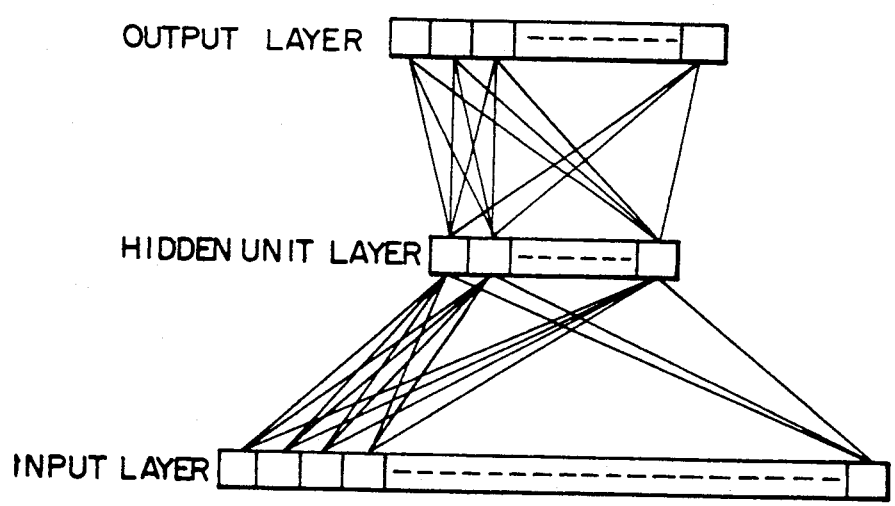
FIG. 7 is a schematic view of a method for displaying, on the screen of a CRT, a connection strength distribution in a neural network model.

FIG. 7 illustrates, by way of example, an in-circuit connection strength distribution which has been established in the neural network model 1400 as a result of learning in the above-described manner and has been displayed on the screen of the CRT of the man-machine unit 2000.

In FIG. 7, the lines indicating the connections between the units are displayed stepwise in colors in accordance with the magnitude of the synaptic weight determined as a result of the learning. Although no color is shown in FIG. 7, these lines are displayed in five stages of red, pink, yellow, green and blue in the descending order of the synaptic weights. Further, the range of synaptic weights corresponding to each color can be set by the user as desired. If all the connections are displayed, many lines cross and cannot be easily seen. Any color can therefore be chosen from the aforementioned 5 colors in the present embodiment.

Figure 8:
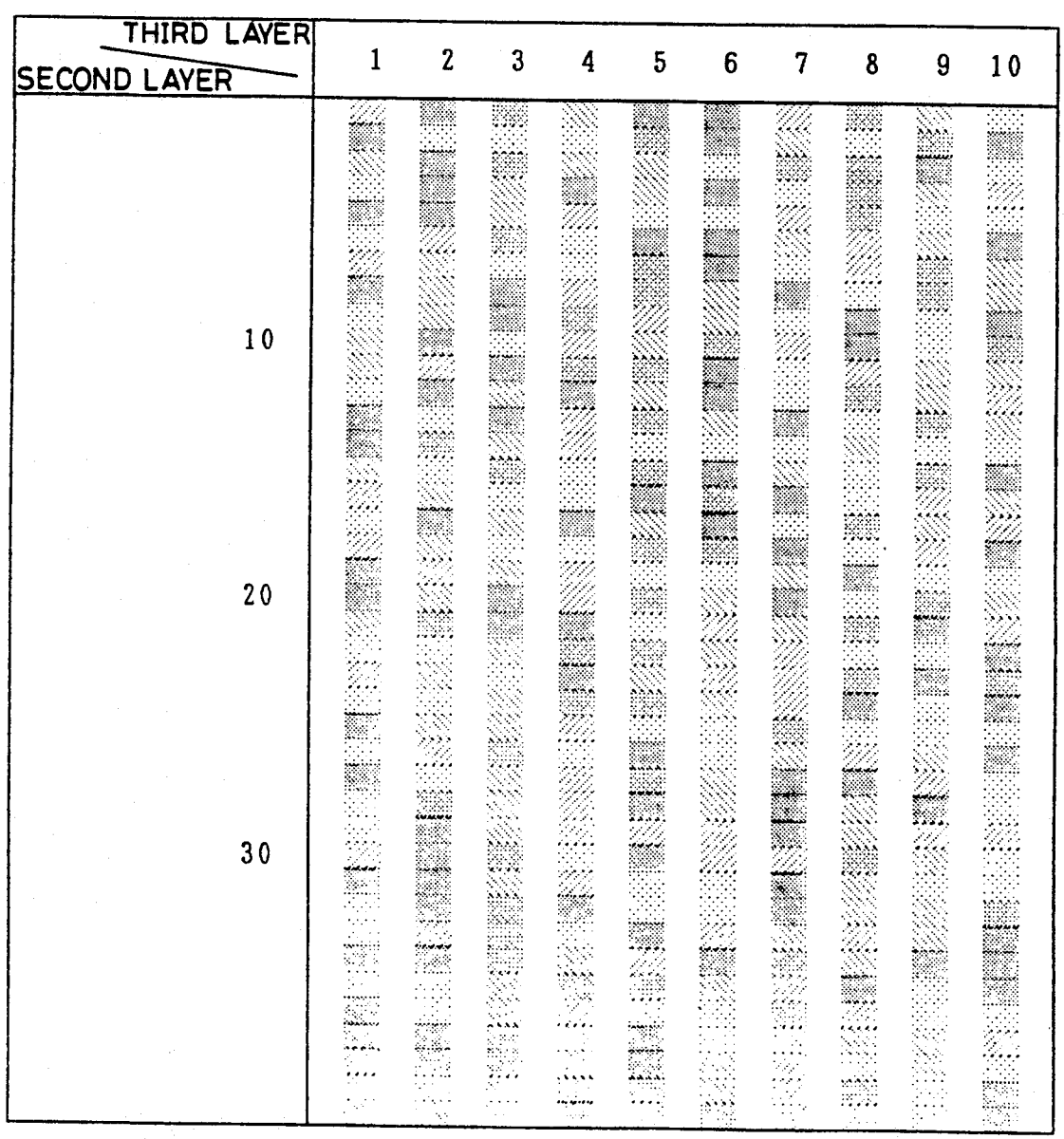
FIG. 8 is a schematic illustration of a method for displaying, on the screen of a CRT, synaptic weight distributions in an output layer and an input portion of a hidden unit layer.

FIG. 8 illustrates a connection strength distribution corresponding to the magnitudes of synaptic weights at input portions of the output layer as an example, as displayed on a similar CRT as that depicted in FIG. 7. In the drawing, the second layer and third layer mean a hidden unit layer and an output layer, respectively. Although the strength distribution is shown by halftone in FIG. 8. It is actually displayed in colors. When a monochromatic display is used, the strength distribution can be displayed by halftone, gradation or the like.

The learning is considered to have been conducted sufficiently provided that the distribution shown in FIG. 8 is a random distribution. Conversely, the learning is considered to be insufficient when the distribution is biased. Based on the distribution, it is therefore possible to decide whether the learning should be repeated further or not.

Figure 9:
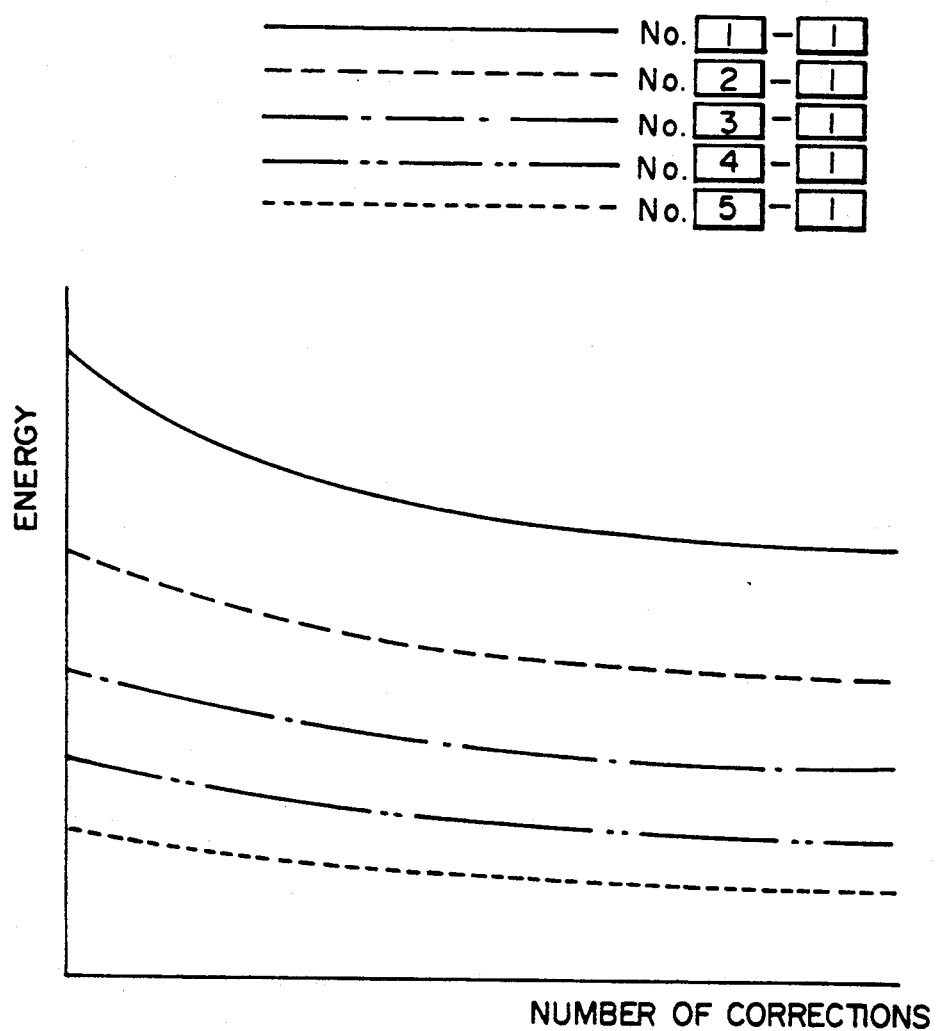
FIG. 9 is a graph showing a method for displaying, on the screen of a CRT, energy trends in the neural network.

FIG. 9 shows energy trends in a neural network model, which have been outputted on the screen of a CRT to investigate the convergence in learning.

Figure 10:
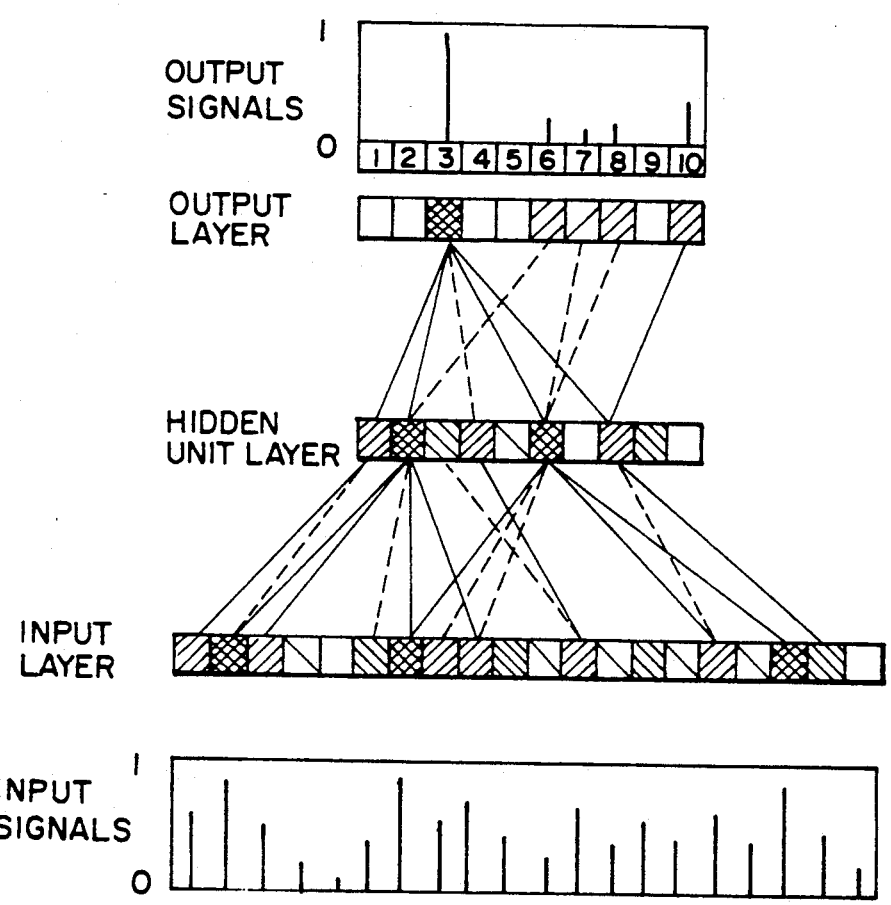
FIG. 10 is a schematic illustration of a method for displaying, on the screen of a CRT, the state of perception of diagnostic results of an abnormality in a neural network model.

In this case, the designation of trend outputs effected by setting the number of learning cycles and the sequential number. Five sets of energy trends are indicated in FIG. 10, in which the number of corrections by back propagation is plotted along the axis of abscissas. The energy E in the neural model is defined by the following formula:

$$E = -\frac{1}{2} \sum_{I=2}^{3} \sum_{J=1}^{L(I)} \sum_{JJ=1}^{L(I-1)} w_{I,J,JJ} y_{I,J} y_{I-1,JJ} \quad (12)$$

where w represents each synaptic weight, y each unit output, I each layer number, and J and JJ each unit numbers in the $I^{th}$ and $I-1^{th}$ layers, respectively.

FIG. 10 shows an exemplary display of a state of perception in the neural network model 1400, namely, diagnostic results of an abnormality on the screen of a CRT when abnormality monitoring data 1210 are fed as input signals to the input layer of the neural network model 1400 while the steam turbine 1 was operated.

The lines connecting the input layer and the hidden unit layer as well as those connecting the hidden unit layer and the output layer are displayed in stepwise colors which can be designated as desired in accordance with the strengths of the signals. The strengths of the input signals and output signals are indicated by histograms, respectively. It is to be noted that the input signals represent the waveform of mechanical vibrations of the turbine when sampled at predetermined intervals and are shown by the histogram on the CRT screen. Each unit is displayed in stepwise colors, which can be designated as desired in accordance with the magnitude of the total input U defined by the formula (2).

It is preferred to make these displays in colors from the standpoint of visibility. Monochromatic displays may also be feasible. In that case, the displays are effected using gradation, different line types, halftone, or the like.

The unit numbers allotted to the output layer correspond to the sample numbers in FIG. 2. It is indicated that the position having the greatest output signal has the highest possibility as the cause of the abnormality.

FIG. 11 depicts, as one example of the foregoing operation, diagnostic results outputted on the CRT screen as a guidance for the operator 3.

In this example, the third phenomenon, i.e., oil or liquid whip is considered as the most probable one. It is understood that the cause is the uneven strength of an oil film on a slide bearing or a fluid force in a water-sealed clearance. Although the phenomena are arranged in the descending order of their possibility, i.e., certainty, in other words, in the descending order of the magnitudes of their output signals. Needless to say, they may be arranged in the opposite order or in the chronological order of the phenomena.

Here, the certainty factor is determined by the level of the output signal. In the present embodiment, the level is set in such a way that level 1 gives 100% certainty factor.

The present embodiment allows to automatically learn vibration waveforms of the steam turbine, said vibration waveforms being obtained on an actual steam turbine, in association with their corresponding abnormal phenomena, so that unlike the conventional method, an expert or specialist is no longer required to prepare a diagnostic logic by spending a lot of time. When the diagnosis of an abnormality is conducted using learned contents of the neural network model, the conversion of an input signal can be effected only by simple functional operation and summing operation and does not require such spectrum analysis and relational tree search as needed in the conventional method. Therefore, the processing can be performed at an extremely high speed. This makes it possible to perform the real time analysis of each abnormality by an inexpensive computer without the need for an expensive high-performance computer or a special equipment. Since the diagnostic results thus obtained can be indicated along with a certainty factor in accordance with the degree of similarity between the patterns already learned and the pattern under diagnosis, objective diagnostic information having high persuasive power can be furnished to the operator.

Further, according to the present embodiment, the user can designate the structural parameter of the neural network model and the learning procedure as desired, and an in-circuit connection strength distribution and an energy trend can be indicated. It is hence possible to achieve effective learning, to shorten the diagnosing time, and also to improve the accuracy of diagnosis.

In addition, this embodiment can indicate, as diagnostic results, a signal level distribution in the neural network and a table of causes of abnormalities arranged in the descending order of their certainly factors to the operator, thereby making it to promptly figure out the situation and take a countermeasure on the basis of the objective information in the event occurrence of an abnormality.

In the description of the present embodiment, the ten types of vibrations shown in FIG. 2 were used as learning samples of abnormal vibrations. However, in practice, the vibration waveform differs fractionally even when the same abnormal phenomenon takes place. To cope with this, plural learning samples are provided for each abnormal phenomenon and are all learnt by the neural network model 1400. As a result, the flexibility of abnormality diagnosis, in other words, the versatility of determination of a waveform is increased.

The ability of determination drops when an abnormal phenomenon has a different phase from its corresponding learning sample even if they have the same waveform. As a measure for this problem, it is only necessary to match the abnormality monitoring data 1210, an input signal, with a standard phase in advance by the data conversion function 1200. The above phase matching is not needed if waveforms having the same shape but phases shifted little by little are learned as learning samples in advance.

The input signals shown in FIG. 10 have the range (0,1). These input signals have been obtained by normalizing the whole range of variations while setting the center of vibrations at 0.5. In this case, the largest one of the amplitudes of all the learning samples is used as a standard value for the normalization. It is however not absolutely necessary to effect the normalization in the above manner. The objects of the present invention can be fully achieved when an amplitude sufficiently greater than those of generally expected abnormal vibrations is chosen as a standard value.

It is necessary to make the wave numbers of the learning samples and abnormality monitoring date 1210 equal to the wave number of the standard wave, namely, the wave number of a waveform having the frequency determined by the speed of rotation of the turbine. In view of the existence of subharmonic resonance like the learning sample No. 7 depicted in FIG. 2, it is desired to choose, as targets for input, wave numbers of 6–9 as converted based on the standard wave.

Although time-dependent vibration waveforms are used as abnormality monitoring data 1210 in the present embodiment, the overall values of vibrations as a function of the speed of rotation are also effective for the diagnosis of abnormalities in the case of rotating machines such as turbines. This method is effective especially for the diagnosis of abnormal vibrations which occur while the speed of rotation of a rotating machine such as a turbine is increased. The cause of the abnormality can be determined by monitoring differences in pattern among the overall values of vibrations which occur while the speed of rotation of a rotating machine is increased, because the resonance frequency differs depending on the cause of abnormality.

In this case, learning samples are provided for each predetermined range of rotation speeds. Thus, the determination of the cause of an abnormality is feasible provided that the abnormality monitoring data are inputted for the respective ranges in the course of a speed increase of a rotating machine such as a turbine.

The present embodiment has been described assuming that it does not have any spectrum analyzing function. Where a spectrum analyzer has already been installed in an actual plant, the accuracy of diagnosis can be improved further by using, as monitoring data, various harmonic waves obtained from the spectrum analyzer, for example, R/3, R/2, R and 2R (R: revolution component), resonant frequency components, etc. Needless to say, it is also necessary in this case to provide learning samples with respect to the above harmonic waves and to have the neural network model 1400 learn them.

Where an actual plant is already provided with acoustic detectors, abnormalities can be diagnosed using acoustic waveforms available from the detectors. In this case, an acoustic waveform is provided as a learning sample for each abnormal phenomenon and the neural network model 1400 is caused to learn it in a similar manner.

In the above description of the present embodiment, nothing has been described with respect to the phase between the angle of rotation of the turbine and the vectorial angle of vibrations, namely, the phase of vibrations. However, depending on equipment including rotating machines such as turbines, it is possible to diagnose an abnormality by paying attention to the fact that the phase of vibrations becomes different in an abnormal state compared to that in a normal state. In this case, the phase of vibrations changes, for example, in two ways, namely, the phase of vibrations changes along the passage of time while a rotating machine such as a turbine is operated at a rated speed of rotation or the phase of vibrations changes as the speed of rotation changes while the speed is increased.

To conduct the diagnosis of an abnormality under these circumstances, time-dependent phase variations and phase variations as a function of the speed of rotation of the turbine are provided as learning samples for the former situation and the latter situation, respectively. It is then necessary to have the neural network model learn them. For the same reasons as described above with respect to the waveform of vibrations, it is necessary, upon learning and abnormality monitoring, to provide a standard point on the axis for time in the former case and to divide numbers of rotation into predetermined ranges.

In this embodiment, other conditions accompaying the operation of the turbine are not used as learning samples or abnormality monitoring data. In the present invention, it is possible to perform a diagnosis by making use of various accomanying conditions which indicate the state of operation of a target equipment, including the case of a turbine. Although a diagnosis can be conducted based on accompanying conditions alone, it should preferably be conducted in combination with the above-described diagnosis by vibrations.

Exemplary various accompaying conditions include, in the case of a turbine for example, the speed of rotation, load, the field current of a generator, the vacuum level of a steam condenser, the oiling pressure for bearings, the oiling temperature for the bearings, the vertical temperature difference in a turbine casing, etc. In this case, learning and diagnosis can be practiced by feeding the above-described various accompanying conditions, which have been normalized using predetermined values as standard values respectively, to each unit of the input layer in the neural network model 1400.

As such accompanying conditions, it is possible to use "1"/"0" signals, indicative of ON/OFF states, rather than continuous values.

For example, in the case of the speed of rotation of the turbine, a "1"/"0" signal is inputted to the corresponding unit, depending on whether the speed of rotation falls within a particular range or not. By the term "particular range" as used herein, is meant if the speed of rotation is in a dangerous speed range or is below or above the dangerous speed range.

As to the load on the other hand, the term "particular range" means whether the load is changing or in a steady state or whether the load is in a specific load range or not. Regarding the field current of the generator, the field current can be used depending on whether it is in the OFF state or in the ON state. Concerning the vacuum level of the steam condenser, the oiling pressure for the bearings, the oiling temperature for the bearings and the vertical temperature difference in the turbine casing, these conditions can be used depending whether they are above or below predetermined values.

The various monitoring data described above can of course be used by inputting them to respective neural network models provided exclusively for the respective conditions. As an alternative, it is also possible to input several types of abnormality monitoring data in combination to a single neural network model. It is also possible to combine both methods.

A description will next be made of neural network models, one constructed in a hierarchical structure and the other in a decentralized structure.

As a diagnostic system making use of a multilayer neural network model, the present embodiment provides the following diagnostic system by way of example.

A state diagnostic system for equipment having elements constructed in a hierarchical structure, said system being adapted to detect information indicative of a state, which occurs upon operation of the equipment, and to diagnose the state of operation of the equipment on the basis of information thus detected, which comprises:

neural network models capable of learning samples of information indicative of various states and performing the determination of the presence or absence of an abnormality and details thereof on the basis of a signal which appears at an output unit when monitoring information on the equipment is inputted, one or more of said neural network models being provided corresponding to each of a plurality of heirarchial stages, and said neural network models being connected in such a way that each neural network model in a relatively upper stage coordinates one or more neural network models in a relatively lower stage and the neural network model in the relatively upper stage uses, as information, diagnostic results by the neural network models in the relatively lower stage.

Owing to the structure, a diagnosis can be conducted independently by the neural network models in each stage. In addition, a systematic diagnosis can be performed by the neural network models in a higher stage.

A diagnostic system of such a hierarchical structure will next be described more specifically.

Figure 12:
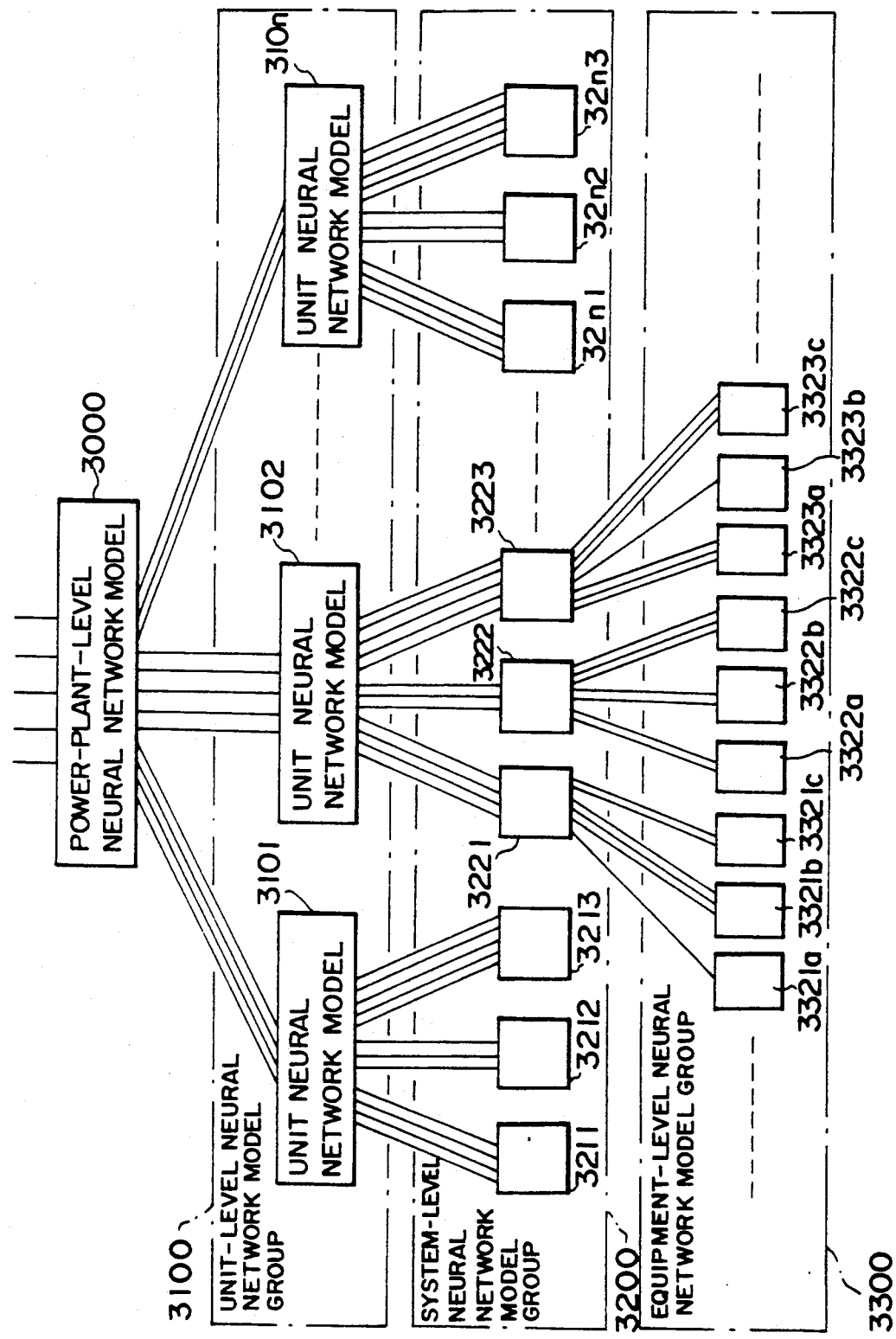
FIG. 12 is a block diagram showing the construction of one embodiment when the present invention is embodied as a multi-stage construction.

For example, a thermal power plant is generally composed of plural power generation units, each of which may be divided into a boiler system, a turbine system and an auxiliary equipment system. Each of such systems is then composed of plural equipment or elements. When the present invention is applied for monitoring and diagnosing abnormal vibrations of a large-scale plant with many equipment combined together in stages such as a thermal power plant, effective learning is feasible by forming a neural network model in a hierarchical, namely, multi-stage structure as illustrated in FIG. 12. With respect to each stage, appropriate diagnostic results and an operation guidance can be indicated independently to the operator.

In the embodiment of FIG. 12, a power-plant-level neural network model group 3000 is positioned in the highest stage, followed downwardly by a unit-level neural network model group 3100, a system-level neural network model group 3200, and equipment-level neural network model group 3300.

The unit-level neural network model group 3100 is composed of #1 unit neural network model 3101, #2 unit neural network model 3102, . . . #n unit neural network model 310n, which correspond to the individual power generation units, respectively.

The system-level neural network model group 3200 is composed of neural network models corresponding respectively to the boiler system, turbine system and auxiliary equipment system, which are included in each of the units described above. In FIG. 12, there are shown #1 boiler-system neural network model 3211, #1 turbine-system neural network model 3212, #1 auxiliary-equipment-system neural network model 3213, #2 boiler-system neural network model 3221, #2 turbine-system neural network model 3222, #2 auxiliary-equipment-system neural network model 3223, #n boiler-system neural network model 32n1, #n turbine-system neural network model 32n2, and #n auxiliary-equipment-system neural network model 32n3.

Included in the equipment-level neural network model group 3300 are neural network models provided corresponding to individual equipment which make up the respective systems. In the embodiment shown in FIG. 12, there are provided #2 burner neural network model 3321a, #2 steam-drum neural network model 3321b and #2 furnace neural network model 3321c, all dependent on #2 boiler-system neural network model 3221; #2 rotor neural network model 3322a, #2 steam-governor neural network model 3322b and #2 oil-pump neural network model 3322c, all dependent on #2 turbine-system neural network model 3222; and #2 feed-water-pump neural network model 3323a, #2 fan neural network model 3323b and #2 feed-water-heater neural network model 3323c, all dependent on #2 auxiliary-equipment-system neural network model 3223.

In the embodiment described above, the overall diagnostic system is in the hierarchical, i.e., multi-stage structure. In the lower stages, the diagnostic system is divided or grouped system by system or equipment by equipment.

Depending on the target of diagnosis, the diagnostic system can be constructed in a divided or decentralized structure instead of constructing it in a hierarchical or multi-stage structure.

When a neural network model is constructed in a hierarchical or multi-stage structure or in a divided or decentralized structure as described above, it is possible to have the neural network model partly learn as needed, thereby making it possible to perform effective learning.

The above embodiment of the present invention has been described taking the diagnosis of abnormalities of a steam turbine by way of example. The present invention can be applied, in a similar manner to the above embodiment, to the diagnosis of the state of operation of various targets provided that the waveforms of mechanical vibrations, acoustic vibrations or oscillations, or electromagnetic vibrations or oscillations inherent to abnormalities of equipment are used. For example, mechanical, acoustic and electromagnetic vibrations and oscillations are all usable for generators and motors. As to equipment such as pumps, fans, crushers, pulverizers, heat exchangers, gas turbines, compressors, air conditioners, freezers, centrifugators, hydraulic equipment, bearings, pressure casings, power transmissions, speed change gears, agitators, steam drums, manifolds, stokers, coal feeders, burners, steam pipes, water feed lines, pipelines, headers, heat transfer lines, valves, injection nozzles, couplers, joints, coal hoppers, air ducts, flues, air dampers, gas dampers, dust collectors, separation tanks, strainers, pressure reducing machines, hydraulic turbines, windmills, rolling machines, reciprocal engines, screws, elevators, escalators, winches, fly wheels, wheels, catapillers, belt conveyors and playground amusement vehicles and equipment, the diagnosis of the state of operation, including the diagnosis of an abnormality, can be carried out in a similar manner to the above embodiment by using the waveforms of mechanical vibrations and those of acoustic vibrations and oscillations.

In the embodiment of the present invention, causes of abnormalities are listed as diagnostic results in the descending order of their certainty factors as shown in FIG. 11. It can be easily materialized to indicate a countermeasure guidance for each cause of abnormality.

Namely, it is only necessary to store countereasure guidances in association with the corresponding learning samples in the learning sample storage unit 1300 shown in FIG. 1. This makes it possible to display a guidance of countermeasures along with the corresponding causes of abnormalities as diagnostic results on the CRT screen of the man-machine unit 2000. The operator can then promptly effect the countermeasure, so that the equipment can be operated safely.

The present embodiment uses, as new learning samples, the waveform of vibrations and other auxiliary conditions at the time of the occurrence of an abnormality, so that such new learning samples can be stored together with the diagnostic results in the learning sample storage function 1300. These new learning samples can be displayed on the CRT screen in accordance with a request from the operator whenever needed. In this embodiment, the diagnostic results are displayed on the CRT. Although not shown in FIG. 1, they can also be easily indicated by an alarm, a light indication, a sound indication and/or the like to allow the operator to promptly figure out the situation and effect a countermeasure in the event of occurrence of an abnormality.

In the embodiments described above, vibration detectors (not shown), vibration waveform memory functions 1100, data conversion functions 1200 and neural network models 1400 are arranged in a 1:1 relationship as shown in FIG. 1. However, vibration waveforms obtained from plural detectors may be used depending on the target of the abnormal vibration monitoring and diagnosis. In such a case, the present invention can be applied without modifications of its essential feature by using any one of the constructions to be described below.

A diagnostic system of the first construction is composed of plural data conversion functions for separately converting vibration waveform data detected respectively by a like plural number of detectors arranged at a like plural number of locations on equipment; and a like plural number of neural network models provided corresponding to the individual locations of the detectors, said neural network models being capable of learning samples of various abnormal vibration phenomena and performing the determination of the presence or absence of an abnormality and details thereof on the basis of the position of a signal which appears at an output unit when the abnormality monitoring data are inputted.

Figure 13:
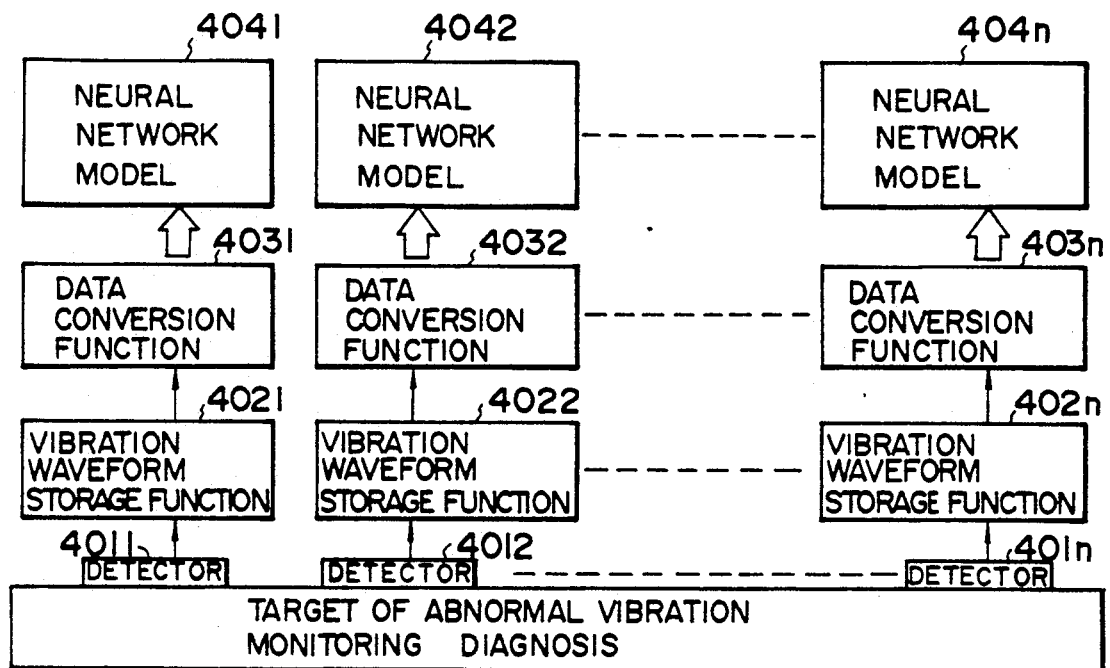
FIGS. 13, 14 and 15 are block diagrams showing other embodiments of the present invention, respectively.

Namely, this system is constructed as shown in FIG. 13, namely, by providing the abnormal vibration monitoring and diagnostic equipment 4000 with plural vibration detectors 4011, 4012, . . . 401n and then providing vibration waveform storage functions 4021,4022, . . . 402n, data conversion functions 4031,4032, . . . 403n and neural network models 4041,4042, . . . 404n, corresponding to these detectors 4011–401n.

The construction illustrated in FIG. 13 performs the storage and data conversion processing of vibrations signals from the individual detectors 4011–401n in an independent manner. This embodiment is effective where the neural network models are different from each other in size or application purpose. Further, this embodiment can be regarded as an assembly of plural diagnostic systems. Such a system is suitable, for example, when the target is divided into plural regions and these regions are independently controlled.

A diagnostic system of the second construction is composed of a data conversion function for converting vibration waveform data, which have been detected by plural detectors arranged at a like plural number of locations on equipment, to abnormality monitoring data in a time-sharing manner; and a like plural number of neural network models provided corresponding to the individual locations of the detectors, said neural network models being capable of learning samples of various abnormal vibration phenomena and performing the determination of the presence or absence of an abnormality and details thereof on the basis of the position of a signal which appears at an output unit when the abnormality monitoring data are inputted.

Figure 14:
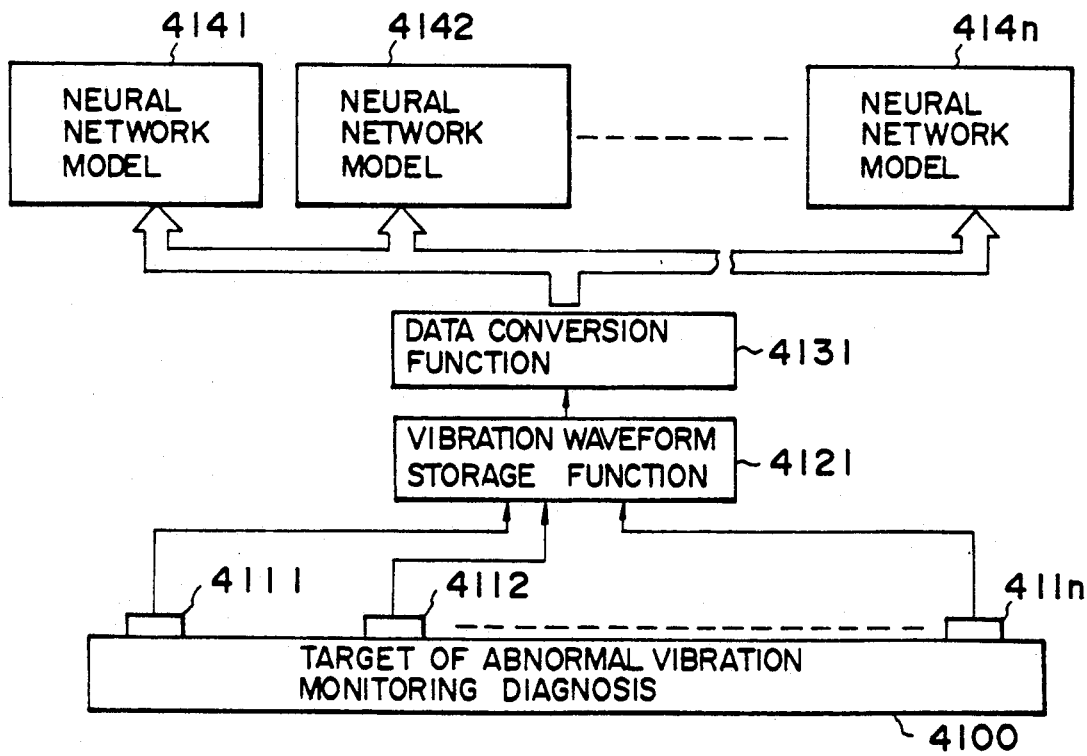

Namely, this system has such a construction that as shown in FIG. 14, plural detectors 4111, 4112, . . . 411n are provided, vibration signals obtained from these detectors are processed in a time-sharing manner at vibration waveform storage function 4121 and data conversion function 4131, and the outputs of the data conversion function 4131 are inputted in a time-sharing manner to plural neural network models 4141, 4142, . . . 414n, respectively.

The construction illustrated in FIG. 14 can perform the storage and data conversion of vibration signals from the individual detectors 4111–411n by a common method, respectively. This embodiment is suitable for use, for example, in such a case that the individual neural network models commonly use the whole data or a part thereof although the neural network models are different from each other in size or in application purpose.

A diagnostic system of the third construction is composed of a data conversion function for converting vibration waveform data, which have been detected by plural detectors arranged at a like plural number of locations on equipment, to abnormality monitoring data in a time-sharing manner; and a like plural number of neural network models provided corresponding to the individual locations of the detectors, said neural network models being capable of learning samples of various abnormal vibration phenomena and performing in a time-sharing manner the determination of the presence or absence of an abnormality and details thereof on the basis of the position of a signal which appears at an output unit when the abnormality monitoring data are inputted.

Figure 15:
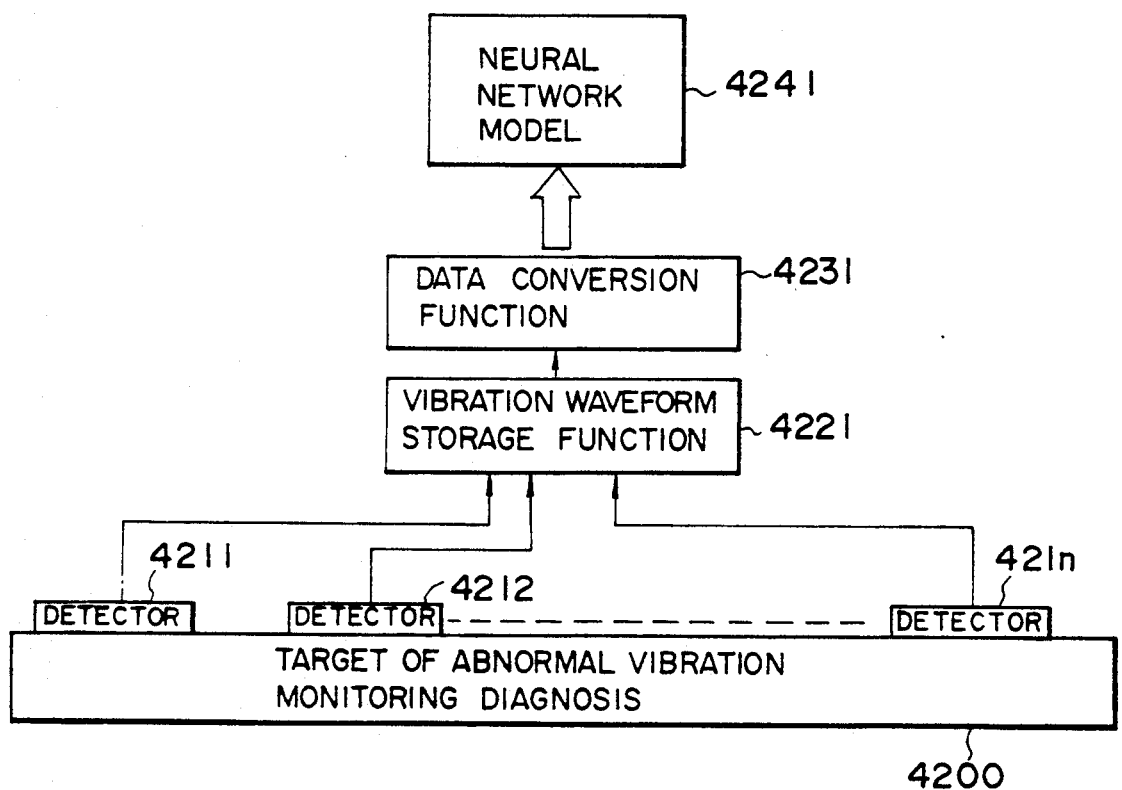

In this system, as illustrated in FIG. 15, plural detectors 4211, 4212, . . . 421n are provided, vibration signals obtained from these detectors are processed in a time-sharing manner at vibration waveform storage function 4221 and data conversion function 4231, and the outputs of the data conversion function 4231 are inputted in a time-sharing manner to a single neural network model 4241 to commonly use the neural network model 4241.

The construction shown in FIG. 15 can perform the storage and data conversion of vibration signals from the individual detectors by a common method, and is effective in such a case that the data from the individual detectors have a similar size and are employed for similar purposes.

The embodiment has been described as a diagnostic system equipped with both learning function and diagnostic function of abnormal vibration phenomena of a target under diagnosis. However, the present invention can be practiced by embodying these functions as separate systems. In this case, the former is embodied as a learning dedicated system while the latter is embodied as a diagnosis dedicated system.

When embodied as the diagnosis dedicated system, the learning sample storage function 1300 store samples of various vibration phenomena detected during the operation of its associated equipment and other similar equipment for learning purpose. The learning control function 1500 causes the neural network model 1400 to learn these samples.

In the case of the diagnosis dedicated system, information inside the neural network model which has completed learning by means of the learning dedicated system, namely, information on the in-circuit connection strength distribution is inputted and set its own neural network model, whereby the diagnostic function works.

The diagnostic function of the diagnosis dedicated system can be obtained by borrowing from the learning dedicated system the neural network model to which the in-circuit connection strength distribution has been applied.

In the present embodiment, the present invention has been described as an abnormality diagnostic system. This invention can also be embodied as an abnormality preview/predict system. In this case, it is only necessary to use information, which is indicative of signs at the time of the occurrence of abnormalities, as samples to be learned by the neural network model 1400.

For example, the abnormality preview/predict system can be constructed a data conversion function for converting vibration information, which has been detected by a detector, to abnormality monitoring data; a neural network model for learning samples of various abnormal vibration phenomena, said neural network model being capable of previewing/predicting the presence or absence of an abnormality and its details in accordance with the position of a signal which appears at an output unit upon input of the abnormality monitoring data; and diagnostic man-machine unit for providing a user with results of the preview/predict as output information from the neural network model.

This abnormality preview/prediction system can be constructed basically in a similar manner to the above-described embodiment of the diagnostic system. This also applies with regard to preferred embodiments. For example, the results of preview/prediction may be outputted as follows:

(1) as the preview/prediction results, to display on a CRT screen at least one of information describing the phenomenon, information describing the cause and information on a countermeasure guidance;

(2) as the preview/prediction results, to display on a CRT screen possible causes along with their respective certainly factors which are determined by the levels of the corresponding outputs from the neural network model; and (3) to inform the user of the preview/predict results by at least one means out of alarm, light indication and voice output.

It is clear from the nature of the present invention that mechanical, acoustic and electromagnetic detection means can be used either singly or in any desired combination as a vibration or oscillation detector in the diagnostic system of the present invention.

Further, it is of course possible to provide the learning sample storage function 1300 or a magnetic disk or magnetic tape—a recording medium of the storage function—itself as an external unit or an externally-furnished data base for the diagnostic system. The basic principle of the invention is not changed by such a modification.

The basic principle of the invention is of course not changed either, even when the diagnostic system is constructed by incorporating the data conversion function 1200 as an external unit of the diagnostic system, namely, as a data converter.

As still further embodiments of the present invention, there are a diagnosis training system and an operation training system. These systems can be constructed by simply adding an assumed abnormality producing function to the abnormality diagnostic system already described above.

The diagnosis training system can be constructed, for example, of a neural network model capable of determining the presence or absence of an abnormality and details thereof on the basis of the position of a signal appeared at an output unit upon input of abnormality monitoring data on a vibration phenomenon of equipment as a target of the training of the diagnosis; an assumed abnormality producing function for setting, as the abnormality monitoring data, information corresponding to various assumed abnormality causes at an input portion of the neural network model; and a man-machine unit for indicating, to a user, diagnosis results which appear at the output unit when the data generated from the assumed abnormality producing function are inputted in the neural network model.

The diagnosis training system of this embodiment and the operation training system of the next embodiment can both be constructed by using the diagnostic system shown in FIG. 1. Namely, they are constructed by the compute processor 1000 and the man-machine unit 2000. Although the assumed abnormality producing function is not illustrated, it can be provided as one function of the compute processor 1000 or it can be arranged externally and connected.

The diagnosis training system is effective in permitting training for the improvement of diagnostic techniques by indicating diagnostic results, which appear at the output unit when data corresponding to respective various assumed abnormality causes are set to the input portion of the neural network model 1400 from the assumed abnormality producing function, to a trainee by means of the CRT screen of the man-machine unit 2000.

On the other hand, the operation training system can be constructed, for example, of a neural network model capable of determining the presence or absence of an abnormality and details thereof on the basis of the position of a signal appeared at an output unit upon input of abnormality monitoring data on a vibration phenomenon of equipment as a target of the training of the operation; an assumed abnormality producing function for setting, as the abnormality monitoring data, data corresponding to various assumed abnormality causes at an input portion of the neural network model; and a man-machine unit for indicating, to a user, a countermeasure guidance based on diagnostic results which appear at the output unit when the data generated from the assumed abnormality producing function are inputted in the neural network model.

The operation training system is effective in permitting training for the improvement of operation techniques by indicating a countermeasure guidance based on diagnostic results, which appear at the output unit when data corresponding to respective various assumed abnormality causes are set to the input portion of the neural network model 1400 from the assumed abnormality producing function, to a trainee by means of the CRT screen.

As still other embodiments of the present invention, there are a service life estimation assisting system for equipment and a maintenance assisting system for equipment. The former estimates the service life of equipment by making use of the fact that the strength or waveform of vibrations varies as the service life of equipment is consumed, and indicates the thus-estimated service life to the operator. On the other hand, the latter prepares a maintenance program for equipment on the basis of the abnormality cause indicated by the abnormal vibration monitoring and diagnostic system already described above or the information on the service life of the equipment, which has been obtained from the service life estimation assisting system described above, and presents it to the operator or the maintenance crew.

These systems can each be constructed likewise the diagnostic system already described above. Therefore, they will hereinafter be described with reference to FIG. 1.

The service life estimation assisting system can be established by providing, as learning samples, plural data in which vibration strengths or vibration waveforms of equipment are correlated to the corresponding service life consumptions, and then having the neural network model 1400 learn them in advance.

This service life estimation assisting system can be constructed of a data conversion function for converting vibration waveform data, which have been detected by detectors, to service life estimating data; a neural network model for learning samples of various vibration phenomena, said neural network model being capable of estimating the service life of the equipment on the basis of the magnitude of a signal which appears at an output unit upon input of the service life estimating data; and a service life estimating man-machine unit for providing a user with results of the service life estimation as output information from the neural network model.

The service life estimation assisting system makes it possible to estimate from information on vibrations the service life of the equipment in operation. It is hence possible to avoid accidents, to say nothing of the facilitation of control of the service life of the equipment.

The maintenance assisting system can be established by providing, as learning samples, information on maintenance programs, namely, places and times of maintenance, working procedures, etc. in association with their corresponding abnormality causes or equipment service life information and then having the neural network model 1400 learn them in advance.

This maintenance assisting system can be constructed of a neural network model for learning as samples maintenance programs along with various corresponding abnormality causes and/or service life information, said neural network model being capable of outputting each of the maintenance programs when its corresponding abnormality cause and/or service life information is inputted; and a maintenance man-machine unit for providing a user with the maintenance program as output information from the neural network model.

The maintenance assisting system can provide a suitable maintenance program in the event of occurrence of an abnormality or pursuant to a request from the operator. It is of course possible to prevent accidents and moreover to make efficient the maintenance work of equipment and to reduce its cost.

In each of the above embodiments, the neural network model is constructed by a compute processor. It may be formed by special hardware. In this case, analog IC, digital IC or the like can be used.

In each of the above embodiments, CRT is used as a display. Other display such as LCD, plasma display or EL can also be used.

The system of each of the above embodiment can be constructed of a portable information processors for example, a laptop computer, thereby providing a portable diagnostic system.

Further, the diagnostic system of the present invention can construct the system of each of the above embodiments, as needed, by providing information or data which correspond to information to be provided as the state of learning or diagnostic results by the neural network model. Moreover, plural kinds of systems can be furnished by a single hardware if plural kinds of such information or data are provided.

In the embodiments described above, the state is diagnosed by using information on vibrations. Diagnosis is feasible by using other information.

We claim:

1. A state diagnostic system for a rotating machine, comprising:

a neural network model for learning in advance one or more samples of time dependent waveforms of vibrations, which are produced in abnormal and normal operation states of the rotating machine, in association with the corresponding operation state, and producing an output signal corresponding to diagnostic results when data related to time dependent waveforms of vibrations produced upon operation of the rotating machine are inputted;

means for inputting to the neural network model the data related to time dependent waveforms of the vibrations produced upon operation of the rotating machine;

means for converting the output signal from the neural network mode into a message to a user and outputting the message as at least a part of diagnostic results; and a man-machine unit having a screen for displaying said message.

2. A state diagnostic system according to claim 1, and further including:

learning means for successively feeding the one or more samples of time dependent waveforms of vibrations, which are produced in abnormal and normal operation states of the rotating machine, to the neural network model and causing the neural network model to learn to produce a different output signal for each operation state.

3. A state diagnostic system for a rotating machine, comprising:

a neural network model for learning in advance at least one sample of time dependent waveforms of vibrations, which are produced in abnormal and normal operation states of the rotating machine, in association with the corresponding operation state, and producing an output signal corresponding to diagnostic results when data related to time dependent waveforms of vibrations produced upon-operation of the rotating machine are inputted;

means for inputting to the neural network model the data related to time dependent waveforms of vibrations produced upon operation of the rotating machine;

learning means for successively feeding the one or more samples of time dependent waveforms of vibrations, which are produced in abnormal and normal operation states of the rotating machine, to the neural network model and causing the neural network model to learn to obtain a different output signal for each operation state; and output means for indicating the state of learning of the neural network model.

4. A method for diagnosing a state of operation of a rotating machine using a state diagnostic system, said system having a neural network model capable of diagnosing a state of operation of the rotating machine, comprising the steps of:

learning one or more samples of time dependent waveforms of vibrations, which are produced in abnormal and normal operation states of the rotating machine, in association with the corresponding operation state, to the neural network model;

inputting data related to time dependent waveforms of vibrations, produced in an operation state of the rotating machine, to the neural network model to obtain an output signal corresponding to diagnostic results; and converting the output signal from the neural network model into a message to a user and outputting the message as at least a part of diagnostic results.

5. A state diagnostic system for a rotating machine, said system being adapted to detect a state of vibrations produced upon operation of the rotating machine and to diagnose a state of the operation of the rotating machine on the basis of detected time dependent waveform information, said system comprising:

a data conversion unit for converting the detected time dependent waveform information, from the rotating machine, to time dependent abnormality monitoring data;

a neural network model for learning from samples of the detected time dependent waveform information, said neural network model determining the presence or absence of an abnormality and details of the abnormality by a position of an output signal which appears at an output unit upon input of the time dependent abnormality monitoring data;

means for converting said output signal from said neural network model into a message and for outputting the message as at least a part of diagnostic results; and a man-machine unit having a screen for displaying said message.

6. A state diagnostic system for a rotating machine, said system being adapted to detect a state of vibrations produced upon operation of the rotating machine and to diagnose a state of the operation of the rotating machine on the basis of detected time dependent waveform information, said system comprising:

a data conversion unit for converting detected time dependent waveform information, from the rotating machine, to time dependent abnormality monitoring data;

a neural network model for learning from samples of the detected time dependent waveform information, said neural network model being capable of determining the presence or absence of an abnormality and details of the abnormality by a position of an output signal which appears at an output unit upon input of the time dependent abnormality monitoring data;

a learning sample storage unit for storing, for learning purpose, the samples of the detected time dependent waveform information;

a learning control unit for causing the neural network model to learn the samples stored in the learning sample storage unit; and a learning man-machine unit for indicating progress of results of the learning of the samples to a user.

7. A system for previewing/predicting an abnormality in the operation of a rotating machine, said system being adapted to detect vibrations produced upon operation of the rotating machine and to preview/predict an occurrence of abnormality in the rotating machine on the basis of detected time dependent waveform information, said system comprising:

a data conversion unit for converting detected time dependent waveform information, from the rotating machine, to time dependent abnormality monitoring data;

a neural network model for learning samples of the time dependent waveform information, said neural network model previewing/predicting an abnormality in accordance with a position of a signal which appears at an output unit upon input of the time dependent abnormality monitoring data; and a diagnostic man-machine unit for providing a user with results of the preview/predict as output information from the neural network model the man-machine unit having a screen for displaying diagnostic results, and the results of the preview/predict to be displayed on the screen including at least one of information describing phenomenon, information describing the cause, or information on a counter-measure guidance.

8. A system for previewing/predicting an abnormality according to claim 7, further comprising:

means for determining certainty factors by levels of the corresponding outputs from the neural network model and displaying the certainty factors on the screen along with respective possible causes.

9. A diagnosis training system for training the diagnosis of a state of operation of a rotating machine, said system comprising:

a neural network model for determining the presence or absence of an abnormality and details thereof on the basis of a position of a signal at an output unit upon input of time dependent abnormality monitoring data on a vibration phenomenon of the rotating machine as a target of the training of the diagnosis;

an assumed abnormality producing unit for setting, as the time dependent abnormality monitoring data, time dependent waveform information from the rotating machine and corresponding to various assumed abnormality causes of the rotating machine at an input portion of the neural network model; and a man-machine unit for indicating, to a user, diagnosis results which appear at the output unit when the data generated from the assumed abnormality producing unit are inputted in the neural network model.

10. A service life estimation assisting system for detecting time dependent waveforms of vibrations produced upon operation of a rotating machine and assisting in estimation of the service life of the rotating machine on the basis of detected time dependent waveform information, which comprises:
- a data conversion unit for converting detected time dependent waveform information, from the rotating machine, to service life estimating data;
- a neural network model for learning samples of various time dependent waveform information, said neural network model estimating the service life of the rotating machine on the basis of the magnitude of a signal which appears at an output unit upon input of the service life estimating data; and
- a service life estimating man-machine unit for providing a user with results of the service life estimation as output information from the neural network model.

11. A state diagnostic system for equipment having elements constructed in a hierarchial structure, said system being adapted to detect time dependent information indicative of a state of operation of the equipment, which occurs upon operation of the equipment, and to diagnose the state of operation of the equipment on the basis of the time dependent information thus detected, said system comprising:
  neural network models for learning samples of time dependent information indicative of various states of the equipment and performing a determination of the presence or absence of an abnormality and details thereof on the basis of a signal which appears at an output unit when time dependent monitoring information from the equipment is inputted, one or more said neural network models being provided corresponding to each of a hierarchy of stages, and said neural network models being connected in such a way that each neural network model in a relatively upper stage coordinates one or more neural network models in a relatively lower stage and the neural network model in the relatively upper stage uses, as time dependent monitoring information, diagnostic results by the neural network models in the relatively lower stage.

12. A state diagnostic system for equipment, said system being adapted to detect time dependent vibration information produced upon operation of the equipment and to diagnose a state of operation of the equipment on the basis of time dependent information thus detected, said system comprising:
  neural network models for learning samples of time dependent information indicative of various states of the equipment and performing a determination of the presence or absence of an abnormality and details thereof on the basis of a signal which appears at an output unit when time dependent monitoring information from the equipment is inputted, said neural network models being provided corresponding to time dependent information to be detected by respective detectors arranged at a like plural number of locations on the equipment so that a diagnosis is independently feasible at each of the locations.

13. A state diagnostic system for equipment, said system being adapted to detect time dependent vibration information produced upon operation of the equipment and to diagnose a state of operation of the equipment on the basis of the detected time dependent information, said system comprising:
  a data conversion unit for converting in a time sharing manner time dependent information, from the equipment, which is detected respectively by plural detectors arranged at a like number of plural locations on the equipment, to time dependent monitoring information; and
  a like plural number of neural network models for learning samples of time dependent information indicative of various states of the equipment and performing a determination of the presence or absence of an abnormality and details thereof on the basis of a signal which appears at an output unit when the time dependent monitoring information is inputted, and said neural network models being provided corresponding to the detectors to receive corresponding time dependent monitoring information which have been converted in the time sharing manner, whereby a diagnosis is independently feasible at each of the locations.

14. A state diagnostic system for equipment, said system being adapted to detect time dependent information produced upon operation of the equipment and to diagnose a state of operation of the equipment on the basis of the detected time dependent information, said system comprising:
  a data conversion unit for converting in a time sharing manner time dependent information, from the equipment, which are detected respectively by plural detectors arranged at a like plural locations on the equipment, to time dependent monitoring information; and
  at least one neural network model for learning samples of time dependent information indicative of various states of the equipment and performing in a time sharing manner a determination of the presence or absence of an abnormality and details thereof on the basis of signals which appear at an output unit when the time dependent monitoring information are inputted in a time sharing manner, whereby a diagnosis is independently feasible with respect to each of the detectors.

15. A state diagnostic system for equipment, comprising:
  a neural network model for learning in advance one or more samples of time dependent waveforms of vibrations, which are produced in abnormal and normal operation states of the equipment, in association with the corresponding operation state, and producing an output signal corresponding to diagnostic results when data related to time dependent waveforms of vibrations produced upon operation of the equipment is inputted;
  means for inputting to the neural network model the data related to time dependent waveforms of vibrations produced upon operation of the equipment;
  means for converting the output signal from the neural network model into a message to a user and outputting the message as at least a part of diagnostic results; and 'a man-machine unit having a screen for displaying said message.

16. A state diagnostic system for according to claim 15, and further including:
  learning means for successively feeding the one or more samples of time dependent waveforms of vibrations, which are produced in abnormal and normal operation states of the equipment, to the neural network model and causing the neural network model to learn to produce a different output signal for each operation state.

17. A state diagnostic system for equipment, comprising:
- a neural network model for learning in advance at least one sample of time dependent waveforms of vibrations, which are produced in abnormal and normal operation states of the equipment, in association with the corresponding operation state, and producing an output signal corresponding to diagnostic results when data related to time dependent waveforms of vibrations produced upon-operation of the equipment is inputted;
- means for inputting to the neural network model the data related to time dependent waveforms of vibrations produced upon operation of the equipment;
- learning means for successively feeding the at least one sample of the time dependent waveforms of vibrations, which are produced in abnormal and normal operation states of the equipment, to the neural network model and causing the neural network model to learn to obtain a different output signal for each operation state; and
- output means for indicating the state of learning of the neural network model.

18. A method for diagnosing a state of operation of equipment using a state diagnostic system, said system having a neural network model for diagnosing a state of operation of the equipment, comprising the steps of:
- learning one or more samples of time dependent waveforms of vibrations, which are produced in abnormal and normal operation states of the equipment, in association with the corresponding operation state, to the neural network model;
- inputting data related to the time dependent waveforms of vibrations, produced in an operation state of the equipment, to the neural network model to obtain an output signal corresponding to diagnostic results; and
- converting the output signal from the neural network model into a message to a user and outputting the message as at least a part of diagnostic results.

19. A state diagnostic system for equipment, said system being adapted to detect time dependent waveform vibration information produced upon operation of the equipment and to diagnose a state of the operation of the equipment on the basis of detected time dependent waveform vibration information, said system comprising:
- a data conversion unit for converting the detected time dependent waveform vibration information, from the equipment, to time dependent abnormality monitoring data;
- a neural network model for learning samples of the detected time dependent waveform information, said neural network model determining the presence or absence of an abnormality and details of the abnormality by a position of an output signal which appears at an output unit upon input of the time dependent abnormality monitoring data;
- means for converting said output signal from said neural network model into a message and for outputting the message as at least a part of diagnostic results; and
- a man-machine unit having a screen for displaying said message.

20. A state diagnostic system for equipment, said system being adapted to detect time dependent waveform vibration information produced upon operation of the equipment to diagnose a state of the operation of the equipment on the basis of detected time dependent waveform vibration information, said system comprising:
- a data conversion unit for converting detected time dependent waveform vibration information, from the equipment, to time dependent abnormality monitoring data;
- a neural network model for learning samples of the detected time dependent waveform vibration information, said neural network model determining the presence or absence of an abnormality and details of the abnormality by a position of an output signal which appears at an output unit upon input of the time dependent abnormality monitoring data;
- a learning sample storage unit for storing, for learning purpose, samples of the detected time dependent waveform vibration information;
- a learning control unit for causing the neural network model to learn the samples stored in the learning sample storage unit; and
- a learning man-machine unit for indicating progress of results of the learning of the samples to a user.

21. A system for previewing/predicting an abnormality in the operation of equipment, said system being adapted to detect time dependent waveform vibration information produced upon operation of the equipment and to preview/predict an occurrence of abnormality in the equipment on the basis of detected time dependent waveform vibration information, said system comprising:
- a data conversion unit for converting detected time dependent waveform vibration information, from the equipment, to time dependent abnormality monitoring data;
- a neural network model for learning samples of various abnormal time dependent waveform vibration information, said neural network model previewing/predicting an abnormality in accordance with a position of a signal which appears at an output unit upon input of the time dependent abnormality monitoring data; and
- a diagnostic man-machine unit for providing a user with results of the preview/predict as output information from the neural network model the man-machine unit having a screen for displaying diagnostic results, and the results of the preview/predict to be displayed on the screen including at least one of information describing phenomenon, information describing the cause, or information on a counter-measure guidance.

22. A diagnosis training system for training the diagnosis of a state of operation of equipment, said system comprising:
- a neural network model for determining the presence or absence of an abnormality and details thereof on the basis of a position of a signal at an output unit upon input of time dependent abnormality monitoring data of a vibration phenomenon of the equipment as a target of the training of the diagnosis;
- an assumed abnormality producing unit for setting, as the time dependent abnormality monitoring data, time dependent waveform information from the equipment and corresponding to various assumed abnormality causes of the equipment, at an input portion of the neural network model; and
- a man-machine unit for indicating, to a user, diagnosis results which appear at the output unit when the data generated from the assumed abnormality producing unit are inputted in the neural network model.

23. A service life estimation assisting system for detecting time dependent waveform vibration information produced upon operation of equipment and assisting in estimation of the service life of the equipment on the basis of detected time dependent waveform vibration information, said system comprising:

a data conversion unit for converting detected time dependent waveform vibration information, related to data from the equipment, to service life estimating data;

a neural network model for learning samples of time dependent waveform vibration information, said neural network model estimating the service life of the equipment on the basis of the magnitude of a signal which appears at an output unit upon input of the service life estimating data; and a service life estimating man-machine unit for providing a user with results of the service life estimation as output information from the neural network model.

* * * * *